United States Patent
Rauscher et al.

(10) Patent No.: US 11,987,476 B2
(45) Date of Patent: May 21, 2024

(54) CRANE AND METHOD FOR CONTROLLING SUCH A CRANE

(71) Applicant: Liebherr-Components Biberach GmbH, Biberach an der Riss (DE)

(72) Inventors: Florentin Rauscher, Stuttgart (DE); Oliver Sawodny, Stuttgart (DE); Samuel Nann, Deilingen (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 682 days.

(21) Appl. No.: 17/256,205

(22) PCT Filed: Jun. 13, 2019

(86) PCT No.: PCT/EP2019/065497
§ 371 (c)(1),
(2) Date: Dec. 26, 2020

(87) PCT Pub. No.: WO2020/001991
PCT Pub. Date: Jan. 2, 2020

(65) Prior Publication Data
US 2021/0122615 A1    Apr. 29, 2021

(30) Foreign Application Priority Data

Jun. 26, 2018 (DE) ..................... 10 2018 005 068.9

(51) Int. Cl.
*B66C 13/06* (2006.01)
*B66C 23/02* (2006.01)
*G05B 15/02* (2006.01)

(52) U.S. Cl.
CPC .......... *B66C 13/063* (2013.01); *B66C 23/022* (2013.01); *B66C 2700/0385* (2013.01); *G05B 15/02* (2013.01); *G05B 2219/40043* (2013.01)

(58) Field of Classification Search
None
See application file for complete search history.

(56) References Cited

U.S. PATENT DOCUMENTS 5,526,946 A * 6/1996 Overton ................ B66C 13/063
212/275
6,496,766 B1 * 12/2002 Bernold ................ B66C 15/065
340/685

(Continued)

FOREIGN PATENT DOCUMENTS

CN    103608282 A    2/2014
CN    207418145 U    5/2018

(Continued)

OTHER PUBLICATIONS

German Search Report for 10 2018 005 068.9 dated Feb. 28, 2019.
(Continued)

*Primary Examiner* — Kyle O Logan
(74) *Attorney, Agent, or Firm* — Troutman Pepper Hamilton Sanders LLP; Ryan A. Schneider; Andrew C. Doherty

(57) ABSTRACT

A crane, in particular a revolving tower crane or a bridge crane, and a method for controlling such a crane, having a hoist cable, which extends from a crane boom and carries a load-receiving means, drive devices for moving crane elements and displacing the load-receiving means, a control apparatus for controlling the drive devices such that the load-receiving means travels along a travel path, and a pendulum damping device for damping pendulum movements of the load-receiving means, wherein the pendulum damping device has a pendulum sensor for detecting pendulum movements of the hoist cable and/or of the load-receiving means and a controller component having a closed control circuit for influencing the control of the drive devices depending on pendulum signals that are indicated by (Continued)

pendulum movements detected by the pendulum sensor and are returned to the control loop.

24 Claims, 14 Drawing Sheets

(56) References Cited

U.S. PATENT DOCUMENTS

| | | | | |
|---|---|---|---|---|
| 7,936,143 | B2* | 5/2011 | Ikeguchi | B66C 13/063 318/566 |
| 9,446,934 | B2* | 9/2016 | Lin | B66C 13/46 |
| 2007/0007354 | A1* | 1/2007 | Mueller | G06Q 10/087 235/462.08 |
| 2007/0176490 | A1* | 8/2007 | He | B60L 50/13 307/10.1 |
| 2009/0194498 | A1* | 8/2009 | Singhose | B66C 13/063 212/275 |
| 2009/0302795 | A1* | 12/2009 | Nichols | G05B 19/425 318/568.16 |
| 2011/0066335 | A1* | 3/2011 | Hashimoto | B66C 13/44 701/50 |
| 2012/0255188 | A1* | 10/2012 | Tang | B66C 13/46 33/365 |
| 2014/0224755 | A1* | 8/2014 | Eriksson | G01C 9/08 700/228 |
| 2015/0149026 | A1* | 5/2015 | Oswald | B66C 23/88 701/32.8 |
| 2015/0217450 | A1* | 8/2015 | Huang | B25J 9/1671 901/3 |
| 2015/0353329 | A1* | 12/2015 | Lin | B66C 13/16 33/333 |
| 2016/0225199 | A1* | 8/2016 | Aoki | G08G 1/123 |
| 2016/0311664 | A1* | 10/2016 | Härkönen | B66C 15/065 |
| 2016/0340861 | A1* | 11/2016 | Takeo | E02F 9/0866 |
| 2023/0249558 | A1* | 8/2023 | Komatsu | B60L 3/0076 701/22 |
| 2023/0266128 | A1* | 8/2023 | Tanaka | G01S 19/396 701/410 |
| 2023/0267588 | A1* | 8/2023 | Ng | G06T 5/50 382/100 |

FOREIGN PATENT DOCUMENTS

| | | |
|---|---|---|
| DE | 10064182 A1 | 5/2002 |
| DE | 10324692 A1 | 1/2005 |
| DE | 112004002196 T5 | 9/2006 |
| DE | 102007041692 A1 | 3/2009 |
| DE | 102009032270 A1 | 1/2011 |
| DE | 202008018206 U1 | 1/2012 |
| DE | 202008018260 U1 | 5/2012 |
| DE | 102011001112 A | 9/2012 |
| DE | 102013011718 A1 | 1/2015 |
| DE | 102016004350 A1 | 10/2017 |
| EP | 1958915 A2 | 8/2008 |
| EP | 2436637 A1 | 4/2012 |
| EP | 2562125 A1 | 2/2013 |
| JP | H08143273 A | 6/1996 |
| JP | 2016222363 A | 12/2016 |
| WO | 2017178106 A1 | 10/2017 |
| WO | 2019007541 A1 | 1/2019 |

OTHER PUBLICATIONS

International Search and Written Open for PCT/EP2019/065497 dated Sep. 20, 2019.

Ulf Schaper et al: "A load position observer for cranes with gyroscope measurements", Jan. 25, 2012 (Jan. 25, 2012), pp. 3563-3568.

First Office Action from Chinese Application No. 201980043661.3 dated Dec. 12, 2022.

* cited by examiner

CRANE AND METHOD FOR CONTROLLING SUCH A CRANE

The present invention relates to a crane, in particular a revolving tower crane, having a hoist cable, which extends from a crane boom and carries a load-receiving means, drive devices for moving a plurality of crane elements and displacing the load-receiving means, a control apparatus for controlling the drive devices such that the load-receiving means travels along a travel path, and a pendulum damping device for damping pendulum movements of the load-receiving means, wherein said pendulum damping device has a pendulum sensor for detecting pendulum movements of the hoist cable and/or of the load-receiving means and a controller component having a closed control circuit for influencing the control of the drive devices depending on pendulum signals that are indicated by pendulum movements detected by the pendulum sensor and are returned to the control circuit. The invention further also relates to a method of controlling a crane in which the control of the drive devices is influenced by a pendulum damping device in dependence on pendulum-relevant parameters.

To be able to travel the lifting hook of a crane along a travel path or between two destination points, various drive devices typically have to be actuated and controlled.

To be able to travel the lifting hook of a crane along a travel path or between two destination points, various drive devices typically have to be actuated and controlled.

Operators of bridge cranes (or ship-to-shore cranes) usually control the drives directly, so it requires a lot of practice and concentration to be able to move a load quickly to the discharge point and to place it safely there. In particular, large pendulum vibrations of the load sometimes occur due to the control of the crane, and only decay very slowly. Avoiding this manually is very difficult and even experienced crane operators do not always or hardly succeed.

What also occurs with some crane types is that they are inherently compliant and can swing themselves, which is hardly predictable by the crane operator taking into account a variety of movement axes. For example with a revolving tower crane in which the hoist cable extends from a trolley that is travelable at the boom of the crane, the slewing gear by means of which the tower with the boom or booms provided thereon are rotated about an upright axis of rotation relative to the tower, the trolley drive by means of which the trolley can be travelled along the boom, and the hoisting gear by means of which the hoist cable can be adjusted and thus the lifting hook can be raised and lowered, typically respectively have to be actuated and controlled. With cranes having a luffable telescopic boom, in addition to the slewing gear that rotates the boom or the superstructure carrying the boom about an upright axis and in addition to the hoisting gear for adjusting the hoist cable, the luffing drive for luffing the boom up and down and the telescopic drive for traveling the telescopic sections in and out are also actuated, optionally also a luffing fly drive on the presence of a luffing fly jib at the telescopic boom. In mixed forms of such cranes and in similar crane types, for example tower cranes having a luffable boom or derrick cranes having a luffable counter-boom, further drive devices can also respectively have to be controlled.

Said drive devices are here typically actuated and controlled by the crane operator via corresponding operating elements such as in the form of joysticks, rocker switches, rotary knobs, and sliders and the like, which, as experience has shown, requires a lot of feeling and experience to travel to the destination points fast and nevertheless gently without any greater pendulum movements of the lifting hook. Whereas travel between the destination points should be as fast as possible to achieve high work performance, the stop at the respective destination point should be gentle without the lifting hook with the load lashed thereto continuing to oscillate.

Such a control of the drive devices of a crane is tiring for the crane operator in view of the required concentration, particularly since often continuously repeating travel paths and monotonous work have to be dealt with. In addition, greater pendulum movements of the suspended load and thus a corresponding hazard potential occur as concentration decreases or also with insufficient experience with the respective crane type if the crane operator does not operate the operating levers or operating elements of the crane sensitively enough. In practice, large pendulum vibrations of the load sometimes occur fast over and over again, even with experienced crane operators due to the control of the crane, and only decay very slowly.

It has already been proposed to counteract the problem of unwanted pendulum movements to provide the control apparatus of the crane with pendulum damping device that intervene in the control by means of control modules and influence the control of the drive devices, for example, prevent or reduce accelerations that are too large of a drive device due to too fast or too strong an actuation of the operating lever or restrict specific travel speeds with larger loads or actively intervene in a similar manner in the travel movements to prevent too great a pendulum of the lifting hook.

Such pendulum damping devices for cranes are known in various embodiments, for example by controlling the slewing gear drive, the luffing drive, and the trolley drive in dependence on specific sensor signals, for example inclination signals and/or gyroscope signals. Documents DE 20 2008 018 260 U1 or DE 10 2009 032 270 A1, for example, show known load pendulum damping device at cranes and their subject-matters are expressly referenced to this extent, that is, with respect to the principles of the pendulum damping device. In DE 20 2008 018 260 U1, for example, the cable angle relative to the vertical and its change is measured by means of a gyroscope unit in the form of the cable angle speed to automatically intervene in the control on an exceeding of a limit value for the cable angle speed with respect to the vertical.

Documents EP 16 28 902 B1, DE 103 24 692 A1, EP 25 62 125 B1, US 2013/0161279 A, DE 100 64 182 A1, or U.S. Pat. No. 5,526,946 B furthermore each show concepts for a closed-loop regulation of cranes that take account of pendulum dynamics or also pendulum and drive dynamics. However, the use of these known concepts on "soft" yielding cranes having elongate, maxed out structures such as on a revolving tower crane having structural dynamics as a rule very quickly results in a dangerous, instable vibration of the excitable structural dynamics.

Such closed-loop regulations on cranes while taking account of pendulum dynamics also form the subject matter of various scientific publications, cf. e.g. E. Arnold, O. Sawodny, J. Neupert and K. Schneider, "Anti-sway system for boom cranes based on a model predictive control approach", *IEEE International Conference Mechatronics and Automation,* 2005, Niagara Falls, Ont., Canada, 2005, pp. 1533-1538 Vol. 3., and Arnold, E., Neupert, J., Sawodny, O., "Model-predictive trajectory generation for flatness-based follow-up controls for the example of a harbor mobile crane", at—*Automatisierungstechnik,* 56 (August 2008), or J. Neupert, E. Arnold, K. Schneider & O. Sawodny, "Tracking and anti-sway control for boom cranes", Control Engineering Practice, 18, pp. 31-44, 2010, doi: 10.1016/j.conengprac.2009.08.003.

Furthermore, a load pendulum damping system for maritime cranes is known from the Liebherr company under the name "Cycoptronic" that calculates load movements and influences such as wind in advance and automatically initiates compensation movements on the basis of this advance calculation to avoid any swaying of the load. Specifically with this system, the cable angle with respect to the vertical and its changes are also detected by means of gyroscopes to intervene in the control in dependence on the gyroscope signals.

With long, slim crane structures having an ambitious payload configuration as is in particular the case with revolving tower cranes, but can also be relevant with other cranes having booms rotatable about an upright axis such as luffable telescopic boom cranes, it is, however, difficult at times with conventional pendulum damping devices to intervene in the control of the drives in the correct manner to achieve the desired pendulum-damping effect. Dynamic effects and an elastic deformation of structural parts arise here in the region of the structural parts, in particular of the tower and of the boom, when a drive is accelerated or decelerated so that interventions in the drive devices—for example a deceleration or acceleration of the trolley drive or of the slewing gear—do not directly influence the pendulum movement of the lifting hook in the desired manner.

On the one hand, time delays in the transmission to the hoist cable and to the lifting hook can occur due to dynamic effects in the structural parts when drives are actuated in an pendulum damping manner. On the other hand, said dynamic effects can also have excessive or even counter-productive effects on a load pendulum. If, for example, a load oscillates due to an actuation of the trolley drive to the rear with respect to the tower that is initially too fast and if the pendulum damping device counteracts this in that the trolley drive is decelerated, a pitching movement of the boom can occur since the tower deforms accordingly, whereby the desired pendulum damping effect can be impaired.

The problem here also in particular occurs with revolving tower cranes due to the lightweight construction that unlike with specific other crane types, the pendulum of the steel structure are not negligible, but should rather be treated in a regulation (closed loop) for safety reasons since otherwise as a rule a dangerous instable vibration of the steel structure can occur.

The principle aim is therefore to detect the pendulum movements and to actively counter them by means of a control system. On the one hand, such a control can serve as an assistance system that allows the crane operator to directly specify the load movement using the control units (instead of the bridge or trolley movement). Thanks to such support, occupational safety and productivity can be increased. What is also an important precondition for the full automation of bridge cranes is the damping of vibrations.

A particular issue here is that systems for active vibration damping could not be cost-effectively upgraded or were not universally applicable. In the scientific publications and industrial products, there can be found many devices and procedures for such vibration damping. However, the research shows that the devices are not usually universal or their upgrading is expensive and time-consuming, whereas the control methods used are only applicable in special cases (e.g. container ship-to-shore cranes).

Further disadvantages result from the fact that so far the known vibration damping systems based on pendulum angle measurements have been quite expensive, Solutions that use special constructions to measure the cable movement just below the trolley, reduce the possible lifting heights/lowering depths of the crane and are therefore often not appreciated in practice, especially as their upgrading is often only possible at a great expense, as a rule, possible tilting movements of the hook are only insufficiently taken into account.

Proceeding therefrom, the present invention is based on the task of creating an improved crane as well as an improved method for its control, which avoid the disadvantages of the prior art and further develop the latter in an advantageous manner. Preferably, the aim is to move the payload according to the set values of the crane operator and to actively dampen undesired pendulum movements by means of a control system, while at the same time undesired movements of the structural dynamics are not stimulated but are also dampened by the control system in order to achieve an increase in safety, easier operability and automation. In particular, the aim is to achieve improved pendulum damping for tower cranes, which takes better account of the various impacts of the crane structure.

According to the invention, the said task is solved by a crane as claimed in claim 1 and a method as claimed in claim 25. Preferred embodiments of the inventions are the subject-matter of the dependent claims.

It is therefore proposed to carry out a pendulum detection on the lifting hook and to provide the pendulum sensor system on the lifting hook with an interface detection device, which is attached to the lifting hook or the load-receiving means and provides acceleration and rotation rate signals, which represent the translatory accelerations and rotation rates of the lifting hook.

Such an inertial measurement unit attached to the load-receiving means, that is sometimes also called an IMU, can have acceleration and rotation rate sensor means for providing acceleration signals and rotation rate signals that indicate, on the one hand, translatory accelerations along different spatial axes and, on the other hand, rotational rates or gyroscopic signals with respect to different spatial axes. Rotational speeds, but generally also rotational accelerations, or also both, can here be provided as rotational rates.

The inertial measurement unit can advantageously detect accelerations in three spatial axes and rotational rates about at least two spatial axes. The accelerometer means can be configured as working in three axes and the gyroscope sensor means can be configured as working in two axes.

The inertial measurement unit attached to the lifting hook can advantageously transmit its acceleration signals and rotational rate signals and/or signals derived therefrom wirelessly to a control and/or evaluation device that can be attached to a structural part of the crane or that can also be arranged separately close to the crane. The transmission can in particular take place to a receiver that can be attached to the trolley and/or to the suspension from which the hoist cable extends. The transmission can advantageously take place via a wireless LAN connection, for example.

A pendulum damping can also be very simply retrofitted to existing cranes by such a wireless connection of an inertial measurement unit without complex retrofitting measures being required for this purpose. Substantially only the inertial measurement unit at the lifting hook and the receiver that communicates with it and that transmits the signals to the control device or regulation device have to be attached.

The deflection of the lifting hook or of the hoist cable can advantageously be determined with respect to the vertical from the signals of the inertial measurement unit in a two-stage procedure. The tilt of the lifting hook is determined first since it does not have to agree with the deflection of the lifting hook with respect to the trolley or to the suspension point and the deflection of the hoist cable with respect to the vertical and then the sought deflection of the lifting hook or of the hoist cable with respect to the vertical is determined from the tilt of the lifting hook and its acceleration. Since the inertial measurement unit is fastened to the lifting hook, the acceleration signals and rotation rate signals are influenced both by the pendulum movements of the hoist cable and by the dynamics of the lifting hook tilting relative to the hoist cable.

An exact estimate of the load pendulum angle that can then be used by a regulator for active pendulum damping can in particular take place by three calculation steps. The three calculation steps can in particular comprise the following steps:

i. A determination of the hook tilt, e.g. by a complementary filter that can determine high frequency portions from the gyroscope signals and low frequency portions from the direction of the gravitational vector and that can assemble them in a mutually complementary manner to determine the hook tilt.

ii. A rotation of the acceleration measurement or a transformation from the body coordinate system into the inertial coordinate system.

iii. Estimation of the load pendulum angle by means of an extended Kalman filter and/or by means of a simplified relation of the pendulum angle to the quotient of transverse acceleration measurement and gravitational constant.

A stabilizing feedback of this pendulum angle estimate to the positioning signals of the bridge or tower crane is calculated by a model-based control.

The highly accurate pendulum angle estimation that can be achieved in this way can basically be used for universal hook types (which can be vulnerable to certain pendulum movements) and comes with a sensor system that can be upgraded at a very low cost. At the same time, there are considerable advantages such as increased safety, improved operability, increased handling performance and automatability.

In addition, the pendulum sensor can be upgraded at low cost.

In this respect, first the tilt of the lifting hook is advantageously determined from the signals of the inertial measurement unit with the aid of a complementary filter that makes use of the different special features of the translatory acceleration signals and of the gyroscopic signals of the inertial measurement unit, with alternatively or additionally, however, a Kalman filter also being able to be used to determine the tilt of the lifting hook from the acceleration signals and rotation rate signals.

The sought deflection of the lifting hook with respect to the trolley or with respect to the suspension point of the hoist cable and/or the deflection of the hoist cable with respect to the vertical can then be determined from the determined tilt of the load-receiving means by means of a Kalman filter and/or by means of a static calculation of horizontal inertial acceleration and acceleration due to gravity.

The pendulum sensor system can in particular have first determination means for determining and/or estimating a tilt of the load-receiving means from the acceleration signals and rotational rate signals of the inertial measurement unit and second determination means for determining the deflection of the hoist cable and/or of the load-receiving means with respect to the vertical from the determined tilt of the load-receiving means and an inertial acceleration of the load-receiving means.

Said first determination means can in particular have a complementary filter having a highpass filter for the rotation rate signal of the inertial measurement unit and a lowpass filter for the acceleration signal of the inertial measurement unit or a signal derived therefrom, with said complementary filter being able to be configured to link an estimate of the tilt of the load-receiving means that is supported by the rotational rate and that is based on the highpass filtered rotational rate signal and an estimate of the tilt of the load-receiving means that is supported by acceleration and that is based on the lowpass filtered acceleration signal with one another and to determine the sought tilt of the load-receiving means from the linked estimates of the tilt of the load-receiving means supported by the rotation rate and by the acceleration.

The estimate of the tilt of the load-receiving means supported by the rotation rate can here comprise an integration of the highpass filtered rotational rate signal.

The estimate of the tilt of the load-receiving means supported by acceleration can be based on the quotient of a measured horizontal acceleration component and a measured vertical acceleration component from which the estimate of the tilt supported by acceleration is acquired using the relationship $$\varepsilon_{\beta,a} = \arctan\left(\frac{\kappa a_x}{\kappa a_z}\right).$$

The second determination means for determining the deflection of the lifting hook or of the hoist cable with respect to the vertical using the determined tilt of the lifting hook can have a filter device and/or an observer device that takes account of the determined tilt of the load-receiving means as the input value and determines the deflection of the hoist cable and/or of the load-receiving means with respect to the vertical from an inertial acceleration at the load-receiving means.

Said filter device and/or observer device can in particular comprise a Kalman filter, in particular an extended Kalman filter.

Alternatively or additionally to such a Kalman filter, the second determination means can also have a calculation device for calculating the deflection of the hoist cable and/or of the load-receiving means with respect to the vertical from a static relationship of the accelerations, in particular from the quotient of a horizontal inertial acceleration and acceleration due to gravity.

The detection device for the position detection of the lifting hook can advantageously comprise an imaging sensor system, for example a camera, that looks substantially straight down from the suspension point of the hoist cable, for example the trolley. An image evaluation device can identify the crane hook in the image provided by the imaging sensor system and can determine its eccentricity or its displacement from the image center therefrom that is a measure for the deflection of the crane hook with respect to the vertical and thus characterizes the load pendulum. Alternatively or additionally, a gyroscopic sensor can detect the hoist cable retraction angle from the boom and/or with respect to the vertical and supply it to the Kalman filter.

In order to achieve better pendulum damping, the pendulum damping measures can take into account not only the actual pendulum movement of the cable itself, but also the dynamics of the crane structure or the steel construction of the crane and its drivetrains. The crane is no longer considered an immobile rigid body that converts drive movements of the drive devices directly and identically, i.e. 1:1, into movements of the suspension point of the hoist cable. The pendulum damping device instead considers the crane as a soft structure whose steel components or structural parts such as the tower lattice and the boom and its drivetrains demonstrate elasticity and yield properties on accelerations and takes these dynamics of the structural parts of the crane into account in the pendulum damping influencing of the control of the drive devices.

In this process, both the pendulum dynamics and the structural dynamics are actively damped by means of a closed regulation loop. The total system dynamics are in particular actively regulated as a coupling of the pendulum/drive/and structural dynamics of the revolving tower crane to move the payload in accordance with the desired specifications. In this respect, sensors are used, on the one hand, for the measurement of system parameters of the pendulum dynamics and, on the other hand, for the measurement of system parameters of the structure dynamics, with non-measurable system parameters being able to be estimated as system states in a model based observer. The control signals for the drives are calculated by a model based regulation as a feedback of the system states, whereby a feedback loop is closed and changed system dynamics result. The regulation is configured such that the system dynamics of the closed feedback loop is stable and regulation errors can be quickly compensated.

Advantageously, a closed control circuit is provided at the crane, in particular at the revolving tower crane or bridge crane, having structural dynamics due to the feedback of measurements not only of the pendulum dynamics, but also of the structural dynamics. The pendulum damping device also includes, in addition to the pendulum sensor for detecting hoist cable movements and/or load-receiving means movements, a structural dynamics sensor system for detecting dynamic deformations and movements of the crane structure or at least of structural components thereof, wherein the regulator module of the pendulum damping device that influences the control of the drive device in an pendulum damping manner is configured to take account of both the pendulum movements detected by the pendulum sensor and the dynamic deformations of the structural components of the crane detected by the structural dynamics sensor system in the influencing of the control of the drive devices. Both the pendulum sensor signals and the structural dynamics sensor signals are fed back to the closed control circuit.

The pendulum damping device therefore considers the crane structure or machine structure not as a rigid, so-to-say infinitely stiff structure, but rather assumes an elastically deformable and/or yielding and/or relatively soft structure that permits movements and/or positional changes due to the deformations of the structural components—in addition to the adjustment movement axes of the machine such as the boom luffing axis or the axis of rotation of the tower.

The taking into account of the movability in itself of the machine structure as a consequence of structural deformations under load or under dynamic loads is in particular of importance with elongated, slim, and deliberately maximized structures such as with revolving tower cranes or telescopic cranes with respect to the static and dynamic conditions—while taking account of the required safety properties—since here noticeable movement portions, for example for the boom and thus for the lifting hook position, also occur due to the deformations of the structural components. To be able to better counteract the pendulum causes, the pendulum damping takes account of such deformations and movements of the machine structure under dynamic loads.

Considerable advantages can hereby be achieved:

The pendulum dynamics of the structural components are initially reduced by the regulation behavior of the control device. The pendulum is here actively damped by the travel behavior or is not even stimulated by the regulation behavior.

The steel construction is equally saved and put under less strain. Impact loads are in particular reduced by the regulation behavior.

The influence of the travel behavior can further be defined by this traveling.

The pitching pendulum can in particular be reduced and damped by the knowledge of the structural dynamics and the regulation process. The load thus behaves more calmly and no longer swings up and down later in the position of rest. Transverse pendulum movements in the peripheral direction about the upright axis of rotation of the boom can also be monitored better by taking account of the tower torsion and the boom swing-folding deformations.

The aforesaid elastic deformations and movements of the structural components and drivetrains and the inherent movements hereby adopted can generally be determined in different manners.

The structural dynamics sensor system provided for this purpose can in particular be configured to detect elastic deformations and movements of structural components under dynamic loads.

Such a structural dynamics sensor system can, for example, comprise deformation sensors such as strain gauges at the steel construction of the crane, for example the lattice structures of the tower and/or of the boom.

Alternatively or additionally, rotation rate sensors, in particular in the form of gyroscopes, gyrosensors, and/or gyrometers, and/or accelerometers and/or speed sensors can be provided to detect specific movements of structural components such as pitch movements of the boom tip and/or rotational dynamic effects at the boom and/or torsion movements and/or bending movements of the tower.

Inclinometers can furthermore be provided to detect inclinations of the boom and/or inclinations of the tower, in particular deflections of the boom from the horizontal and/or deflections of the tower out of the vertical.

In general, the structural dynamics sensor system can here work with different sensor types and can in particular also combine different sensor types with one another. Advantageously, strain gauges and/or accelerometers and/or rotation rate sensors, in particular in the form of gyroscopes, gyrosensors, and/or gyrometers, can be used to detect the deformations and/or dynamic movements of structural components of the crane in themselves, with the accelerometers and/or rotational rate sensors preferably being configured as detecting three axes.

Such structural dynamics sensors can also be provided at the boom and/or at the tower, in particular at its upper section at which the boom is supported, to detect the dynamics of the tower. For example, jerky hoisting movements result in pitching movements of the boom that are accompanied by bending movements of the tower, with a continued swaying of the tower in turn resulting in pitching movements of the boom, which is accompanied by corresponding lifting hook movements.

An angle sensor system can in particular be provided to determine the differential angle of rotation between an upper end tower section and the boom, with, for example, a respective angle sensor being able to be attached to the upper end tower section and at the boom, with the signals of said angle sensors being able indicate said differential angle of rotation on a differential observation. A rotational rate sensor can furthermore also advantageously be provided to determine the rotational speed of the boom and/or of the upper end tower section to be able to determine the influence of the tower torsion movement in conjunction with the aforesaid differential angle of rotation. On the one hand, a more exact load position estimate can be achieved from this, but, on the other hand, also an active damping of the tower torsion in ongoing operation.

In an advantageous further development of the invention, biaxial or triaxial rotational rate sensors and/or accelerometers can be attached to the boom tip and/or to the boom in the region of the upright axis of rotation of the crane to be able to determine structurally dynamic movements of the boom.

Alternatively or additionally, motion sensors and/or acceleration sensors can be associated with the drivetrains to be able to detect the dynamics of the drivetrains. For example, rotary encoders can be associated with the pulley blocks of the trolley for the hoist cable and/or with the pulley blocks for a guy cable of a luffing boom to be able to detect the actual cable speed at the relevant point.

Suitable motion sensors and/or speed sensors and/or accelerometers are advantageously also associated with the drive devices themselves to correspondingly detect the drive movements of the drive devices and to be able to put them in relation with the estimated and/or detected deformations of the structural components such as of the steel construction and with yield values in the drivetrains.

The movement portion and/or acceleration portion at a structural part, said portion going back to a dynamic deformation or torsion of the crane structure and being in addition to the actual crane movement such as is induced by the drive movement and would also occur with a completely stiff, rigid crane, can in particular be determined by a comparison of the signals of the movement sensors and/or accelerometers directly associated with the drive devices and of the signals of the structural dynamics sensors with knowledge of the structural geometry. If, for example, the slewing gear of a revolving tower crane is adjusted by 10°, but a rotation only about 9° is detected at the boom tip, a conclusion can be drawn on a torsion of the tower and/or a bending deformation of the boom, which can simultaneously in turn be compared, for example, with the rotation signal of a rotational rate sensor attached to the tower tip to be able to differentiate between tower torsion and boom bending. If the lifting hook is raised by one meter by the hoisting gear, but a pitch movement downward about, for example, 1° is simultaneously determined at the boom, a conclusion can be drawn on the actual lifting hook movement while taking account of the radius of the trolley.

The structural dynamics sensor system can advantageously detect different directions of movement of the structural deformations. The structural dynamics sensor system can in particular have at least one radial dynamics sensor for detecting dynamic movements of the crane structure in an upright plane in parallel with the crane boom and at least one pivot dynamics sensor for detecting dynamic movements of the crane structure about an upright crane axis of rotation, in particular a tower axis. The controller component of the pendulum damping device can be configured here to influence the control of the drive devices, in particular of a trolley drive and a slewing gear drive, in dependence on the detected dynamic movements of the crane structure in the upright plane in parallel with the boom, in particular in parallel with the longitudinal boom direction, and on the detected dynamic movements of the crane structure about the upright axis of rotation of the crane.

The structural dynamics sensor system can furthermore have at least one lifting dynamics sensors for detecting vertical dynamic deformations of the crane boom and the controller component of the pendulum damping device can be configured to influence the control of the drive devices, in particular of a hoisting gear drive, in dependence on the detected vertical dynamic deformations of the crane boom.

The structural dynamics sensor system is advantageously configured to detect all the eigenmodes of the dynamic torsions of the crane boom and/or of the crane tower whose eigenfrequencies are disposed in a predefined frequency range. For this purpose, the structural dynamics sensor system can have at least one tower sensor, preferably a plurality of tower sensors, that is/are arranged spaced apart from a node of a eigen-pendulum of a tower for detecting tower torsions and can have at least one boom sensor, preferably a plurality of boom sensors that is/are arranged spaced apart from a node of a eigen-pendulum of a boom for detecting boom torsions.

A plurality of sensors for detecting a structural movement can in particular be positioned such that an observability of all the eigenmodes is ensured whose eigenfrequencies are disposed in the relevant frequency range. One sensor per pendulum movement direction can generally be sufficient for this purpose, but in practice the use of a plurality of sensors is recommended. For example, the positioning of a single sensor in a node of the measured variable of a structural eigenmode (e.g. position of the trolley at a rotation node of the first boom eigenmode) results in the loss of the observability, which can be avoided by the inclusion of a sensor at another position. The use of triaxial rotational rate sensors or accelerometers at the boom tip and on the boom close to the slewing gear is in particular recommendable.

The structural dynamics sensor system for detecting the eigenmodes can generally work with different sensor types, and can in particular also combine different sensor types with one another. Advantageously, the aforesaid strain gauges and/or accelerometers and/or rotational rate sensors, in particular in the form of gyroscopes, gyrosensors, and/or gyrometers, can be used to detect the deformations and/or dynamic movements of structural components of the crane in themselves, with the accelerometers and/or rotational rate sensors preferably being configured as detecting three axes.

The structural dynamics sensor system can in particular have at least one rotational rate sensor and/or accelerometer and/or strain gauge for detecting dynamic tower deformations and at least one rotational rate sensor and/or accelerometer and/or strain gauge for detecting dynamic boom deformations. Rotational rate sensors and/or accelerometers can advantageously be provided at different tower sections, in particular at least at the tower tip and at the articulation point of the boom and optionally in a center tower section below the boom. Alternatively or additionally, rotational rate sensors and/or accelerometers can be provided at different sections of the boom, in particular at least at the boom tip and/or the trolley and/or the boom foot at which the boom is articulated and/or at a boom section of the hoisting gear. Said sensors are advantageously arranged at the respective structural component such that they can detect the eigenmodes of its elastic torsions.

In a further development of the invention, the pendulum damping device can also comprise an estimation device that estimates deformations and movements of the machine structure under dynamic loads that result in dependence on control commands input at the control station and/or in dependence on specific control actions of the drive devices and/or in dependence on specific speed and/or acceleration profiles of the drive devices while taking account of circumstances characterizing the crane structure. System parameters of the structural dynamics, optionally also of the pendulum dynamics, that cannot be detected or can only be detected with difficulty by sensors can in particular be estimated by means of such an estimation device.

Such an estimation device can, for example, access a data model in which structural parameters of the crane such as the tower height, the boom length, stiffnesses, moments of inertia of an area, and similar are stored and/or are linked to one another to then estimate on the basis of a specific load situation, that is, the weight of the load suspended at the lifting hook and the instantaneous outreach which dynamic effects, that is, deformations in the steel construction and in the drivetrains, result for a specific actuation of a drive device. The pendulum damping device can then intervene in the control of the drive devices and influence the control variables of the drive regulators of the drive devices in dependence on such an estimated dynamic effect to avoid or to reduce pendulum movements of the lifting hook and of the hoist cable.

The determination device for determining such structural deformations can in particular comprise a calculation unit that calculates these structural deformations and movements of the structural part resulting therefrom on the basis of a stored calculation model in dependence on the control commands entered at the control station. Such a model can have a similar structure to a finite element model or can be a finite element model, with advantageously, however, a model being used that is considerably simplified with respect to a finite element model and that can be determined empirically by a detection of structural deformations under specific control commands and/or load states at the actual crane or at the actual machine. Such a calculation model can, for example, work with tables in which specific deformations are associated with specific control commands, with intermediate values of the control commands being able to be converted into corresponding deformations by means of an interpolation apparatus.

In accordance with a further advantageous aspect of the invention, the regulator module in the closed feedback loop can comprise a filter device or an observer that, on the one hand, observes the structurally dynamic crane reactions and the hoist cable pendulum movements or lifting hook pendulum movements as they are detected by the structural dynamics sensor system and the pendulum sensor and are adopted with specific control variables of the drive regulator so that the observer device or filter device can influence the control variables of the regulator with reference to the observed crane structure reactions and pendulum reactions while taking account of predetermined principles of a dynamic model of the crane that can generally have different properties and can be obtained by analysis and simulation of the steel construction.

Such a filter device or observer device can in particular be configured in the form of a so-called Kalman filter to which the control variables of the drive regulator of the crane, on the one hand, and both the pendulum signals of the pendulum sensor and the structural dynamics signals that are fed back to the feedback loop, on the other hand, that indicate deformations and/or dynamic movements of the structural components in themselves are supplied as an input value and which influences the control variables of the drive regulators accordingly from these input values using Kalman equations that model the dynamic system of the crane structure, in particular its steel components and drivetrains, to achieve the desired pendulum damping effect.

Detected and/or estimated and/or calculated and/or simulated functions that characterize the dynamics of the structural components of the crane are advantageously implemented in the Kalman filter.

Dynamic boom deformations and tower deformations detected by means of the structural dynamics sensor system and the position of the lifting hook detected by means of the pendulum sensor system, in particular also its oblique pull with respect to the vertical, that is, the deflection of the hoist cable with respect to the vertical are in particular supplied to said Kalman filter.

In accordance with a further advantageous aspect of the invention, a regulation structure having two degrees of freedom is used in the pendulum damping by which the above-described feedback is supplemented by a feedforward. In this respect, the feedback serves to ensure stability and for a fast compensation of regulation errors; in contrast the feedforward serves a good guiding behavior by which no regulation errors occur at all in the ideal case.

The feedforward can here advantageously be determined via the method known per se of differential flatness. Reference is made with respect to said method of differential flatness to the dissertation "Use of flatness based analysis and regulation of nonlinear multivariable systems" by Ralf Rothfuss, VDI-Verlag, 1997, that is to this extent, i.e. with respect to said method of differential flatness, made part of the subject matter of the present disclosure.

Since the deflections of the structural movements are only small in comparison with the driven crane movements and the pendulum movements, the structural dynamics can be neglected for the determination of the feedforward, whereby the crane, in particular the revolving tower crane, can be represented as a flat system having the load coordinates as flat outputs.

The feedforward and the calculation of the reference states of the structure having two degrees of freedom are therefore advantageously calculated, in contrast with the feedback regulation of the closed feedback loop, while neglecting the structural dynamics, i.e. the crane is assumed to be a rigid or so-to-say infinitely stiff structure for the purposes of the feedforward. Due to the small deflections of the elastic structure, that are very small in comparison with the crane movements to be carried out by the drives, this produces only very small and therefore negligible deviations of the feedforward. For this purpose, however, the description of the revolving tower crane—assumed to be rigid for the purposes of the feedforward—in particular of the revolving tower crane as a flat system is made possible which can easily be inverted. The coordinates of the load position are flat outputs of the system. The required desired progression of the control variables and of the system states can be exactly calculated algebraically from the flat outputs and their temporal derivatives (inverse system)—without any simulation or optimization. The load can thus be moved to a destination position without overshooting.

The load position required for the flatness based feedforward and its derivations can advantageously be calculated from a trajectory planning module and/or by a desired value filtering. If now a desired progression for the load position and its first four time derivatives is determined via a trajectory planning or a desired value filtering, the exact progression of the required control signals for controlling the drives and the exact progression of the corresponding system states can be calculated via algebraic equations in the feedforward.

In order not to stimulate any structural movements by the feedforward, notch filters can advantageously be interposed between the trajectory planning and the feedforward to eliminate the excitable eigenfrequencies of the structural dynamics from the planned trajectory signal.

The model underlying the regulation can generally have different properties. A compact representation of the total system dynamics is advantageously used as coupled pendulum/drive/and structural dynamics that are suitable as the basis for the observer and the regulation. In an advantageous further development of the invention, the crane regulation model is determined by a modeling process in which the total crane dynamics are separated into largely independent parts, and indeed advantageously for a revolving tower crane into a portion of all the movements that are substantially stimulated by a slewing gear drive (pivot dynamics), a portion of all the movements that are substantially stimulated by a trolley drive (radial dynamics), and the dynamics in the direction of the hoist cable that are stimulated by a winch drive.

The independent observation of these portions while neglecting the couplings permits a calculation of the system dynamics in real time and in particular simplifies the compact representation of the pivot dynamics as a distributed parameter system (described by a linear partial differential equation) that describes the structural dynamics of the boom exactly and can be easily reduced to the required number of eigenmodes via known methods.

The drive dynamics are in this respect advantageously modeled as a 1st order delay element or as a static gain factor, with a torque, a rotational speed, a force, or a speed being able to be predefined as the adjustment variable for the drives. This control variable is regulated by the secondary regulation in the frequency inverter of the respective drive.

The pendulum dynamics can be modeled as an idealized, single/double simple pendulum having one/two dot-shaped load masses and one/two simple cables that are assumed either as mass-less or as with mass with a modal order reduction to the most important cable eigenmodes.

The structural dynamics can be derived by approximation of the steel structure in the form of continuous bars as a distributed parameter model that can be discretized by known methods and can be reduced in the system order, whereby it adopts a compact form, can be calculated fast, and simplifies the observer design and regulation design.

Said pendulum damping device can monitor the input commands of the crane operator on a manual actuation of the crane by actuating corresponding operating elements such as joysticks and the like and can override them as required, in particular in the sense that accelerations that are, for example, specified as too great by the crane operator are reduced or also that counter-movements are automatically initiated if a crane movement specified by the crane operator has resulted or would result in an pendulum of the lifting hook. The regulation module in this respect advantageously attempts to remain as close as possible to the movements and movement profiles desired by the crane operator to give the crane operator a feeling of control and overrides the manually input control signals only to the extent it is necessary to carry out the desired crane movement as free of pendulum and vibrations as possible.

Alternatively or additionally, the pendulum damping device can also be used on an automated actuation of the crane in which the control apparatus of the crane automatically travels the load-receiving means of the crane between at least two destination points along a travel path in the sense of an autopilot. In such an automatic operation in which a travel path determination module of the control apparatus determines a desired travel path, for example in the sense of a path control and an automatic travel control module of the control apparatus controls the drive regulator or drive devices such that the lifting hook is traveled along the specified travel path, the pendulum damping device can intervene in the control of the drive regulator by said travel control module to travel the crane hook free of pendulum or to damp pendulum movements.

The invention is explained in more detail below on the basis of a preferred exemplary embodiment and the corresponding drawings. The drawings show:

Figure 3:
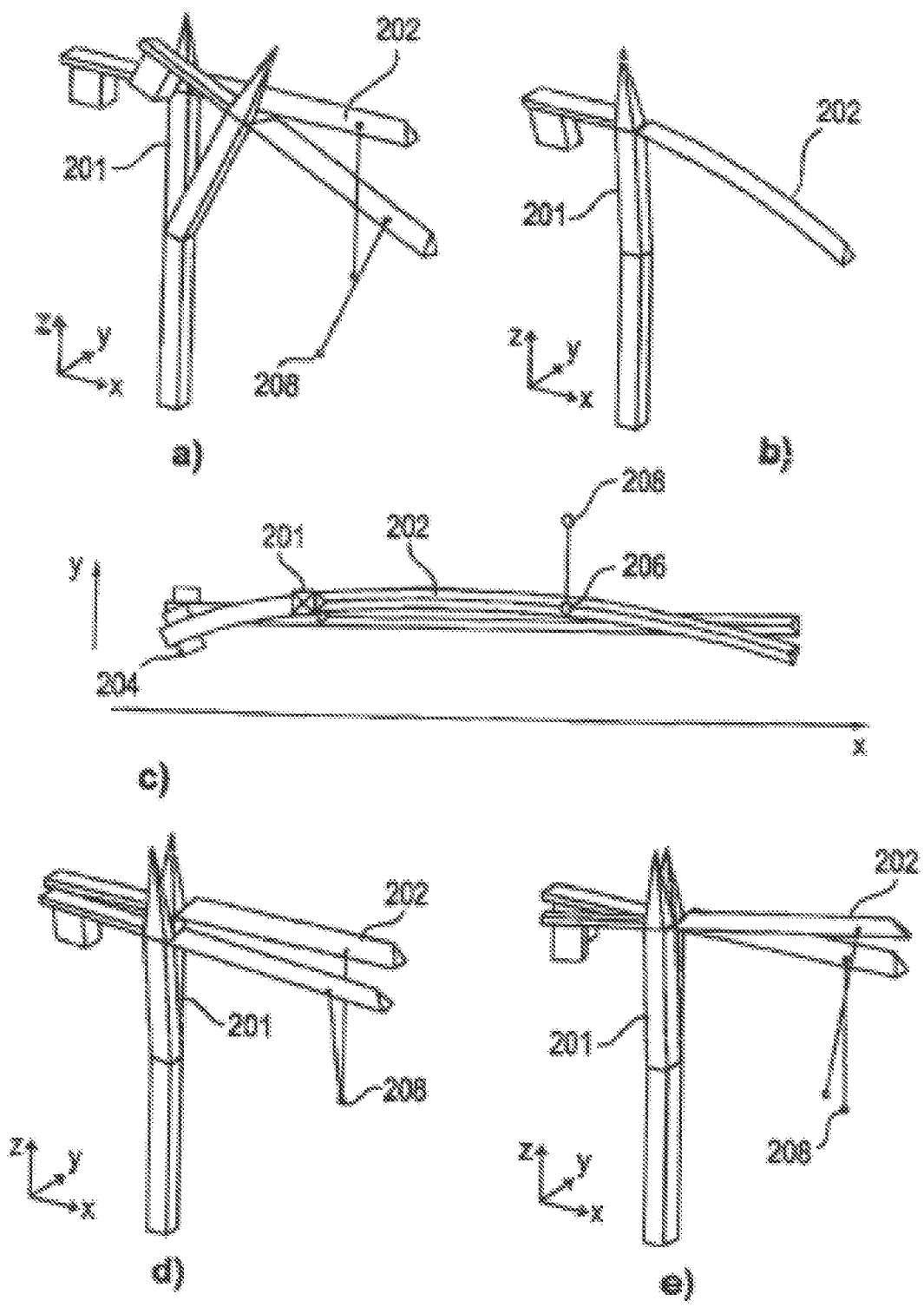
Figure 4:
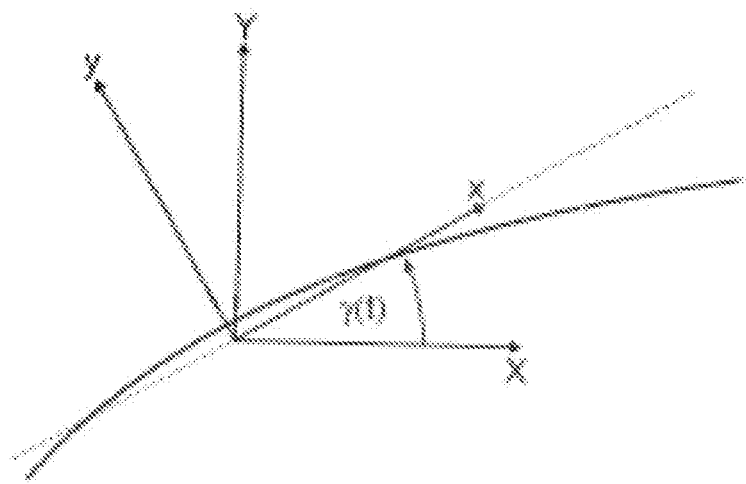
Figure 5:
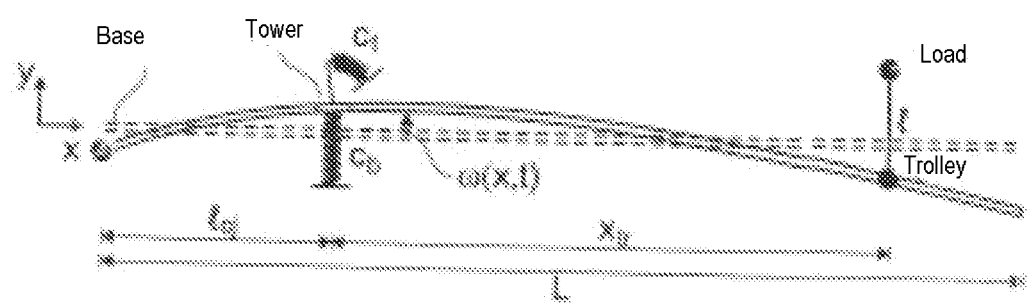
Figure 6:
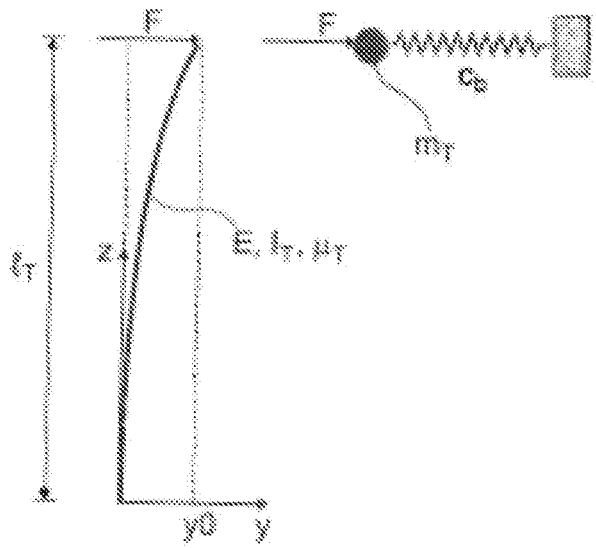
Figure 7:
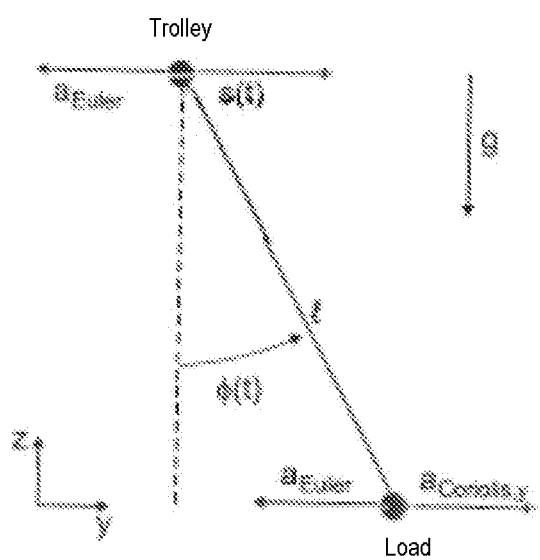
Figure 8:
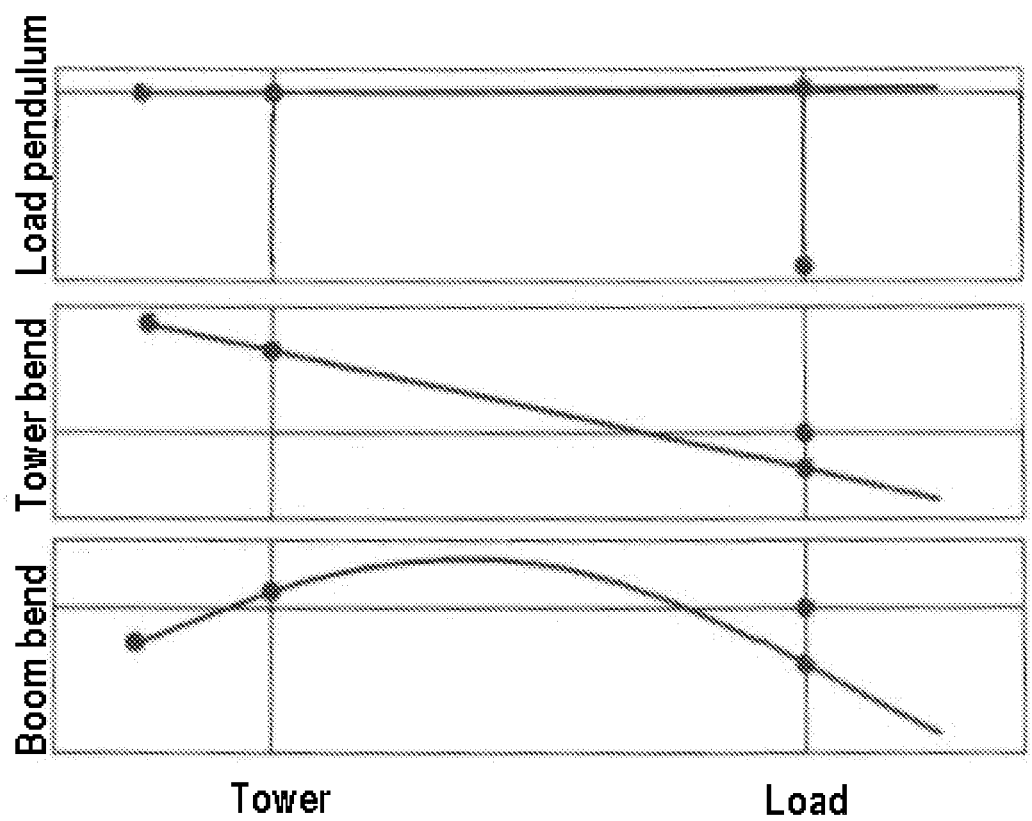
Figure 9:
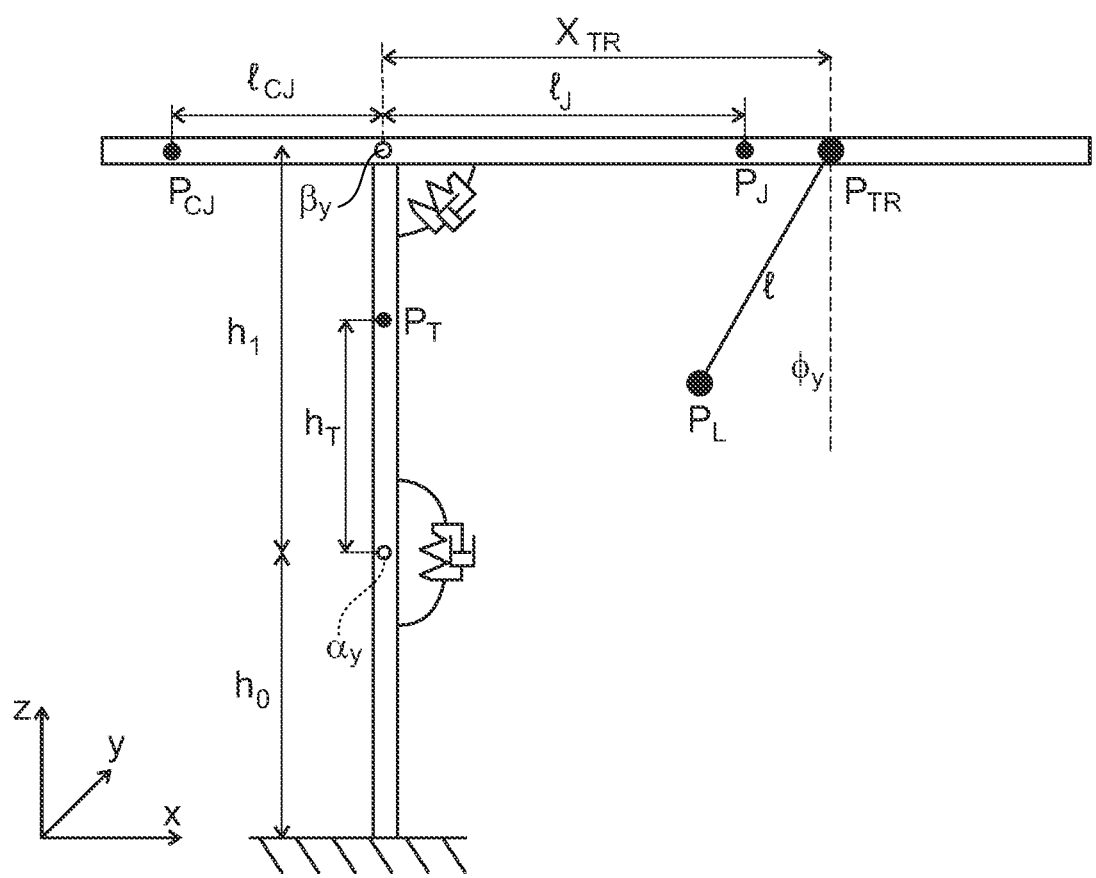
Figure 10:
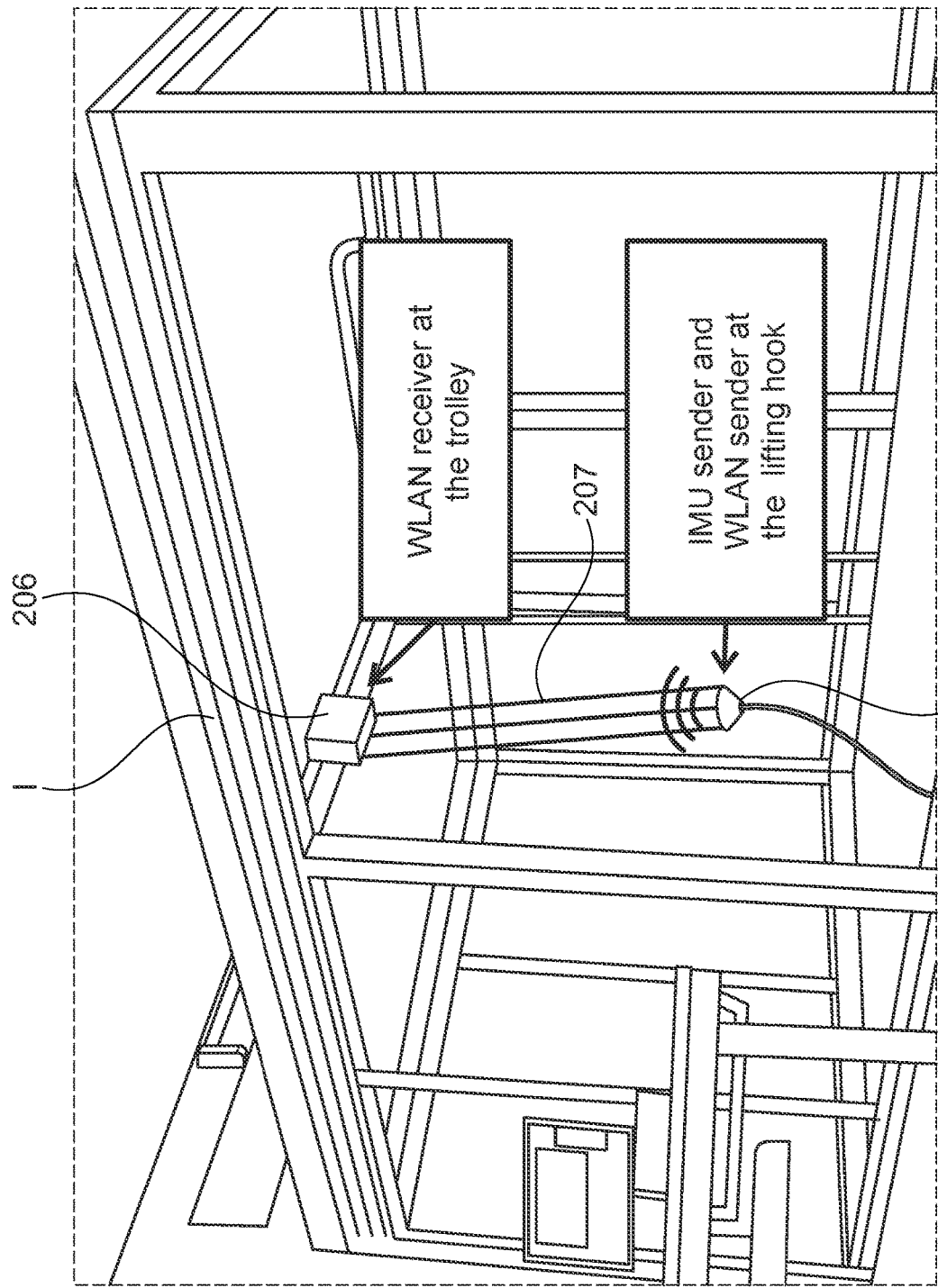
Figure 11:
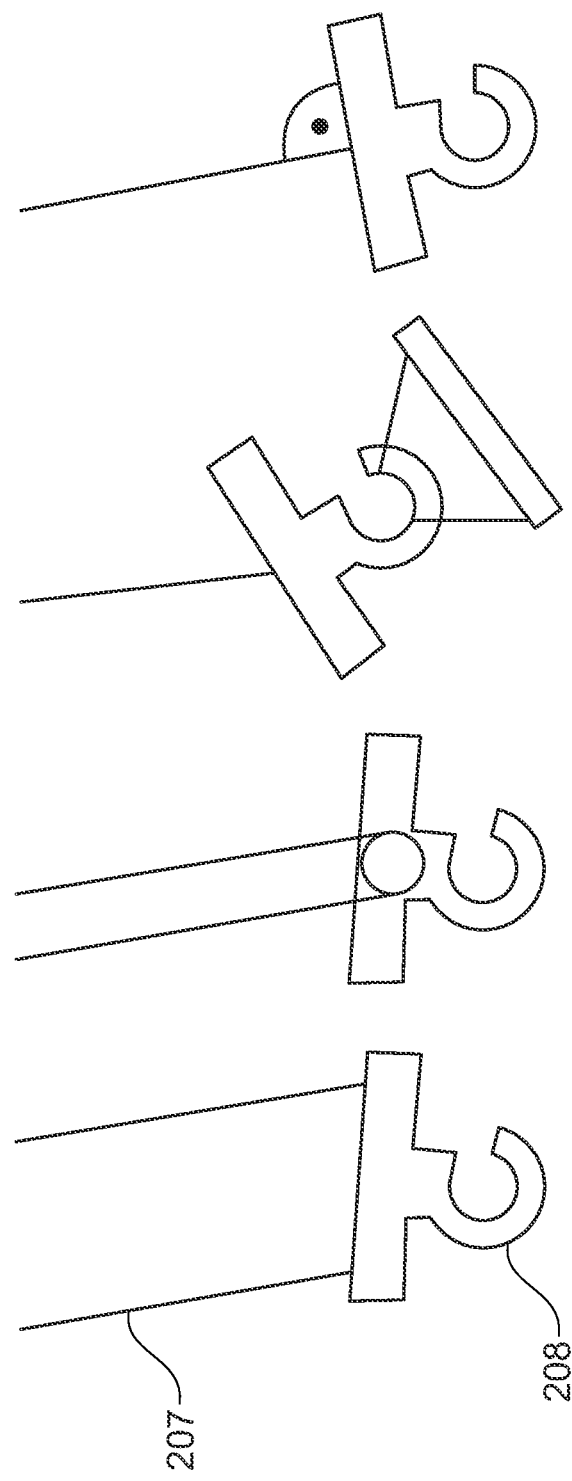
Figure 12:
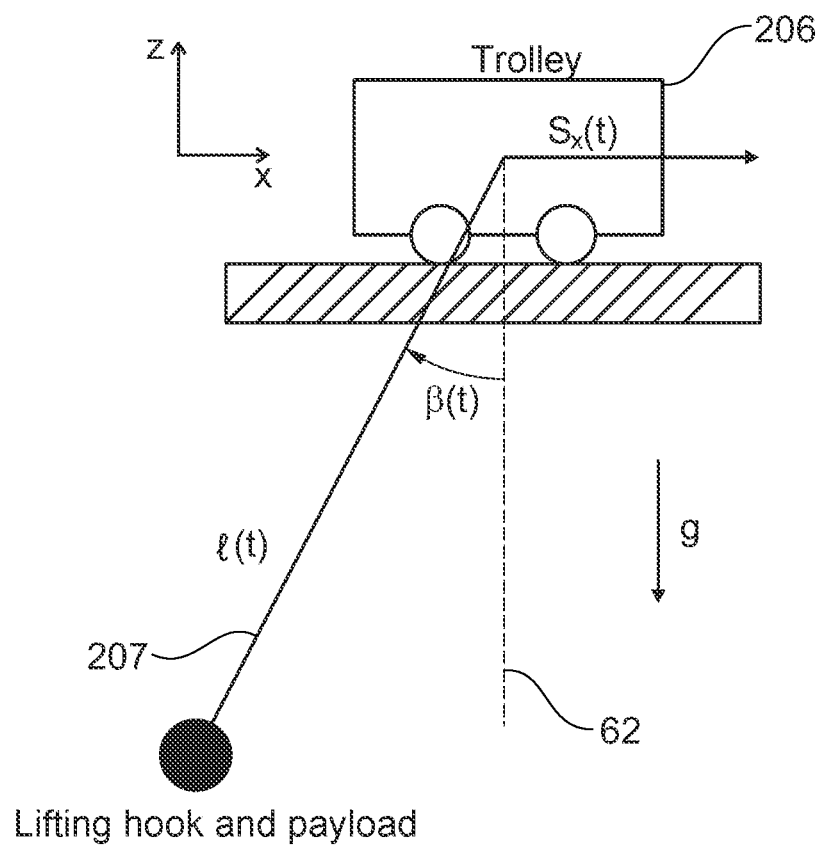
Figure 13:
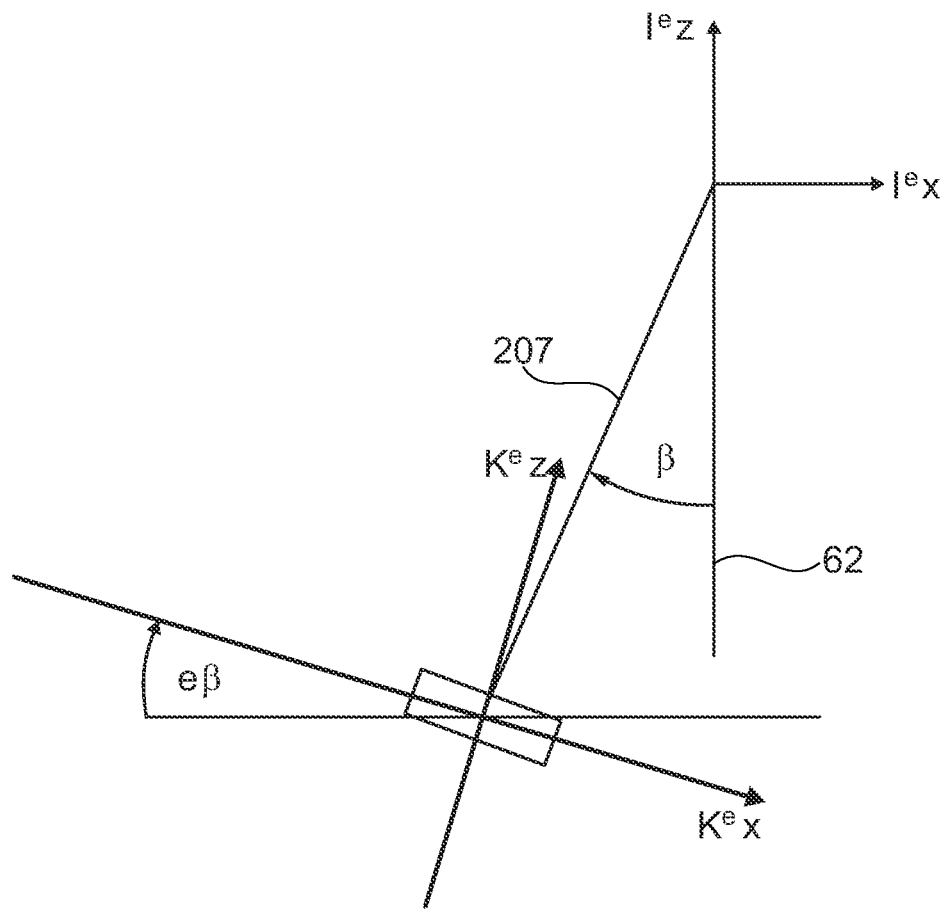
Figure 14:
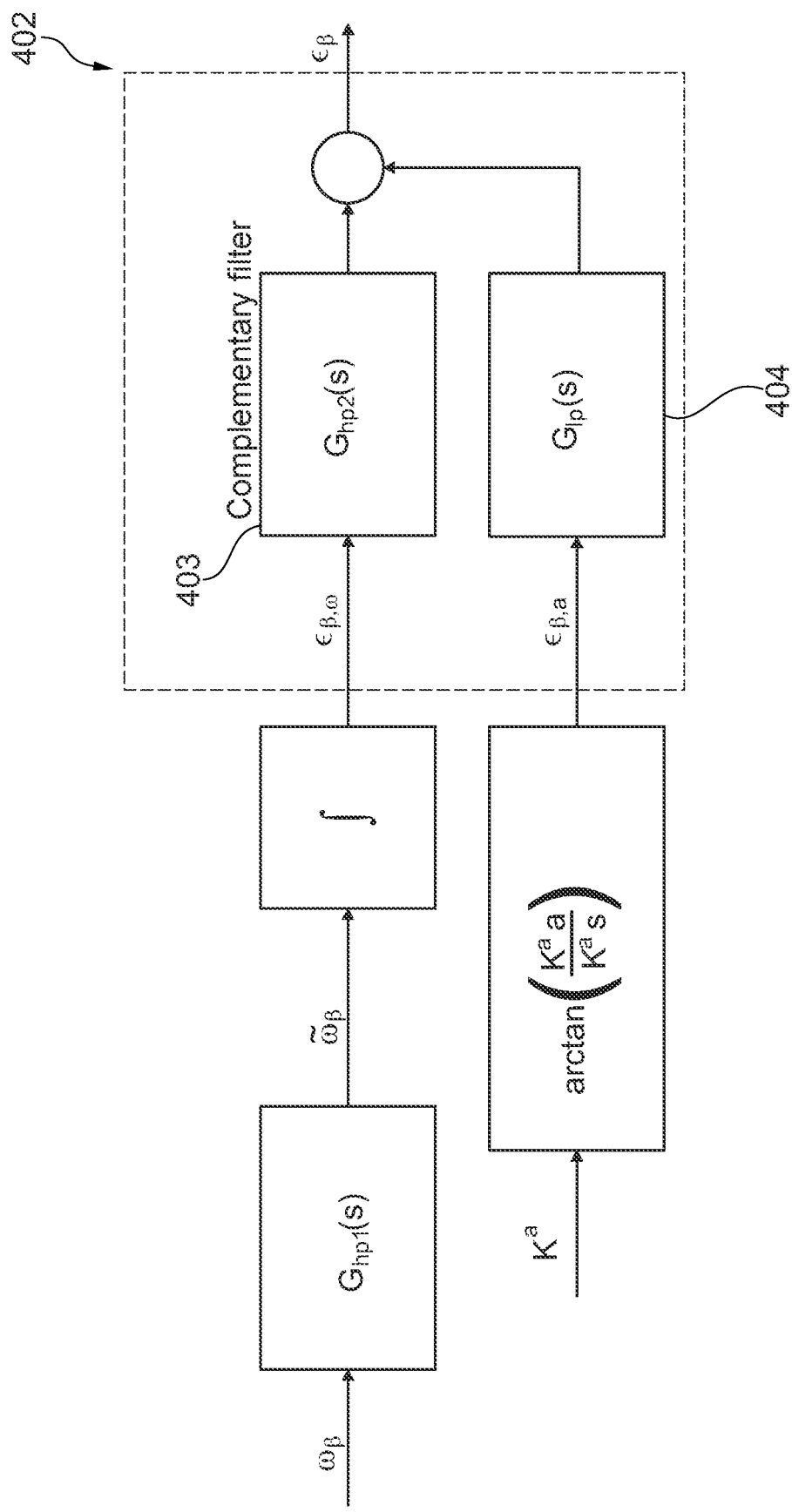
Figure 15:
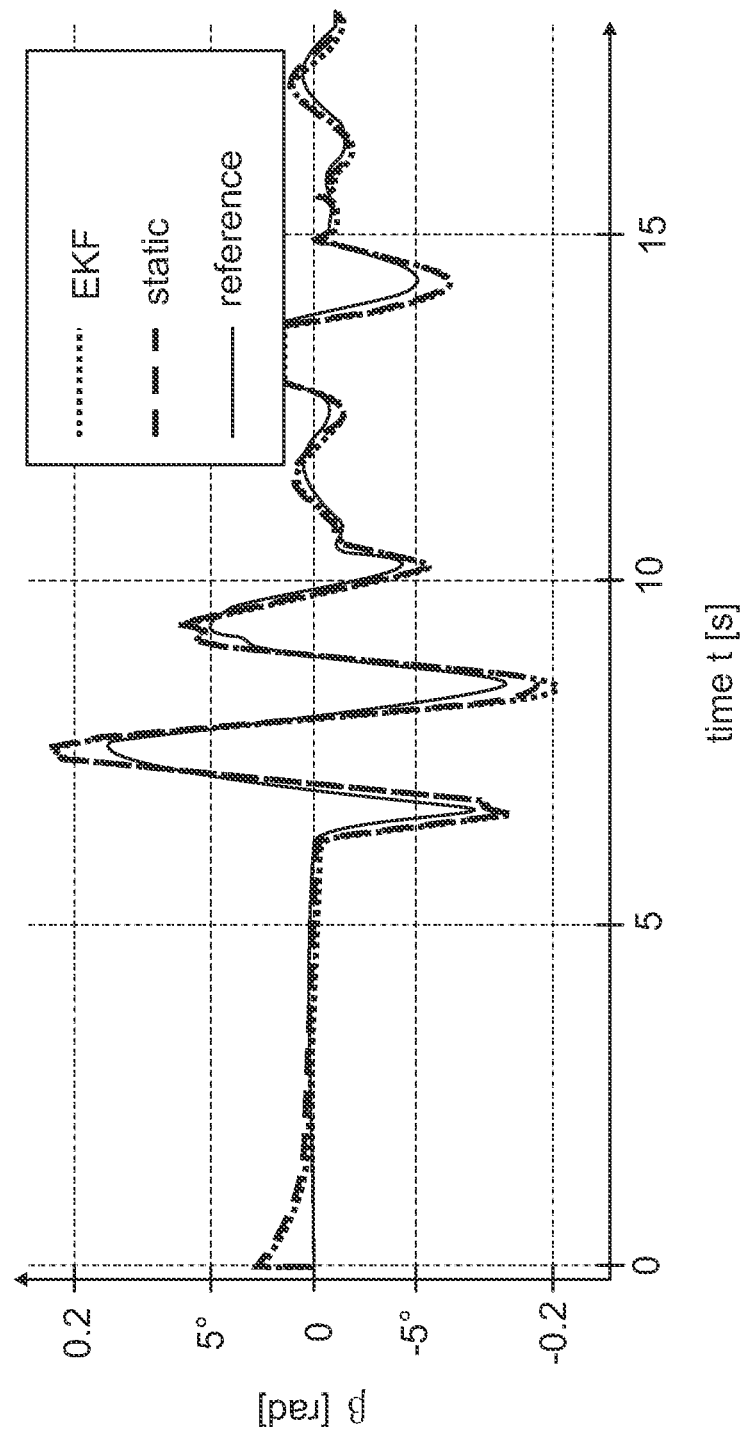
Figure 16:
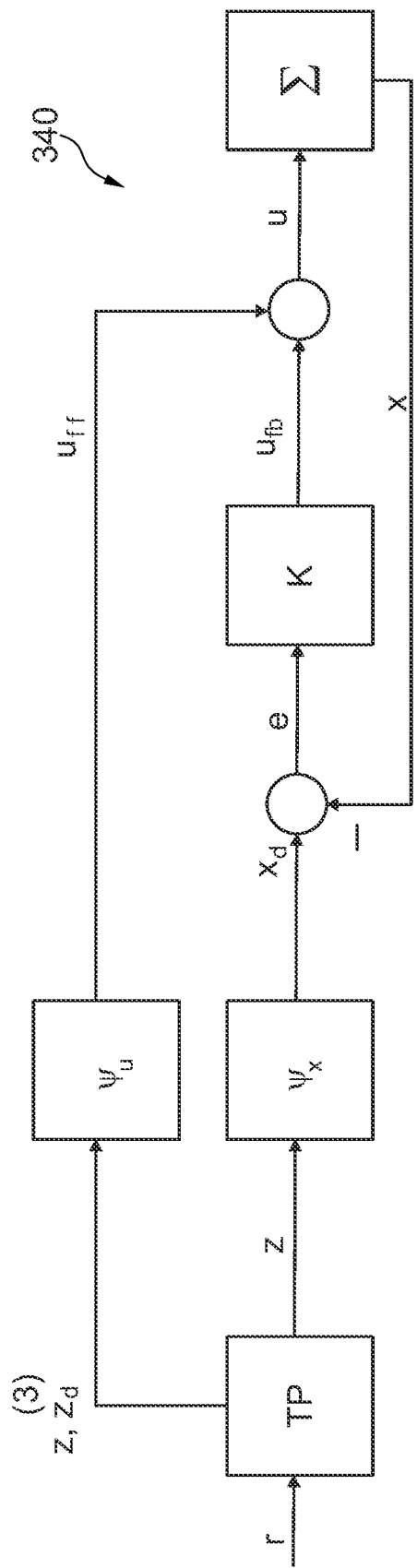

FIG. 3 illustrates a schematic representation of deformations and swaying forms of a revolving tower crane under load and their damping or avoiding by an oblique pull regulation, wherein the partial view a.) shows a pitching deformation of the revolving tower crane under load and an oblique pull of the hoist cable linked thereto, the partial views b.) and c.) show a transverse deformation of the revolving tower crane in a perspective representation and in a plan view from above, and partial views d.) and e.) show an oblique pull of the hoist cable linked to such transverse deformations;

FIG. 4 illustrates a schematic representation of an elastic boom in a reference system rotating with the rotational rate;

FIG. 5 illustrates a schematic representation of a boom as a continuous beam with clamping in the tower while taking account of the tower bend and the tower torsion;

FIG. 6 illustrates a schematic representation of an elastic tower and of a mass-spring replacement model of the tower bend transversely to the boom;

FIG. 7 illustrates a schematic representation of the pendulum dynamics in the pivot direction of the crane with a concentrated load mass and a mass-less cable;

FIG. 8 illustrates a schematic representation of the three most important eigenmodes of a revolving tower crane;

FIG. 9 illustrates a schematic representation of the pendulum dynamics in the radial direction of the crane and its modeling by means of a plurality of coupled rigid bodies;

FIG. 10 illustrates a schematic representation of an pendulum hoist cable with a lifting hook at which an inertial measurement unit is fastened that transmits its measurement signals wirelessly to a receiver at the trolley from which the hoist cable extends;

FIG. 11 illustrates a schematic representation of different lifting hooks to illustrate the possible tilt of the lifting hook with respect to the hoist cable;

FIG. 12 illustrates a schematic two-dimensional model of the pendulum dynamics of the lifting hook suspension of the two preceding Figures;

FIG. 13 illustrates a representation of the tilt or of the tilt angle of the lifting hook that describes the rotation between inertial and lifting hook coordinates;

FIG. 14 illustrates a block diagram of a complementary filter with a highpass filter and a lowpass filter for determining the tilt of the lifting hook from the acceleration signals and the rotation rate signals of the inertial measurement unit;

FIG. 15 illustrates a comparative representation of the pendulum angle progressions determined by means of an extended Kalman filter and by means of a static estimate in comparison with the pendulum angle progression measured at a Cardan joint; and FIG. 16: illustrates a schematic representation of a control or regulation structure with two degrees of freedom for an automatic influencing of the drives to avoid pendulum vibrations.

Figure 1:
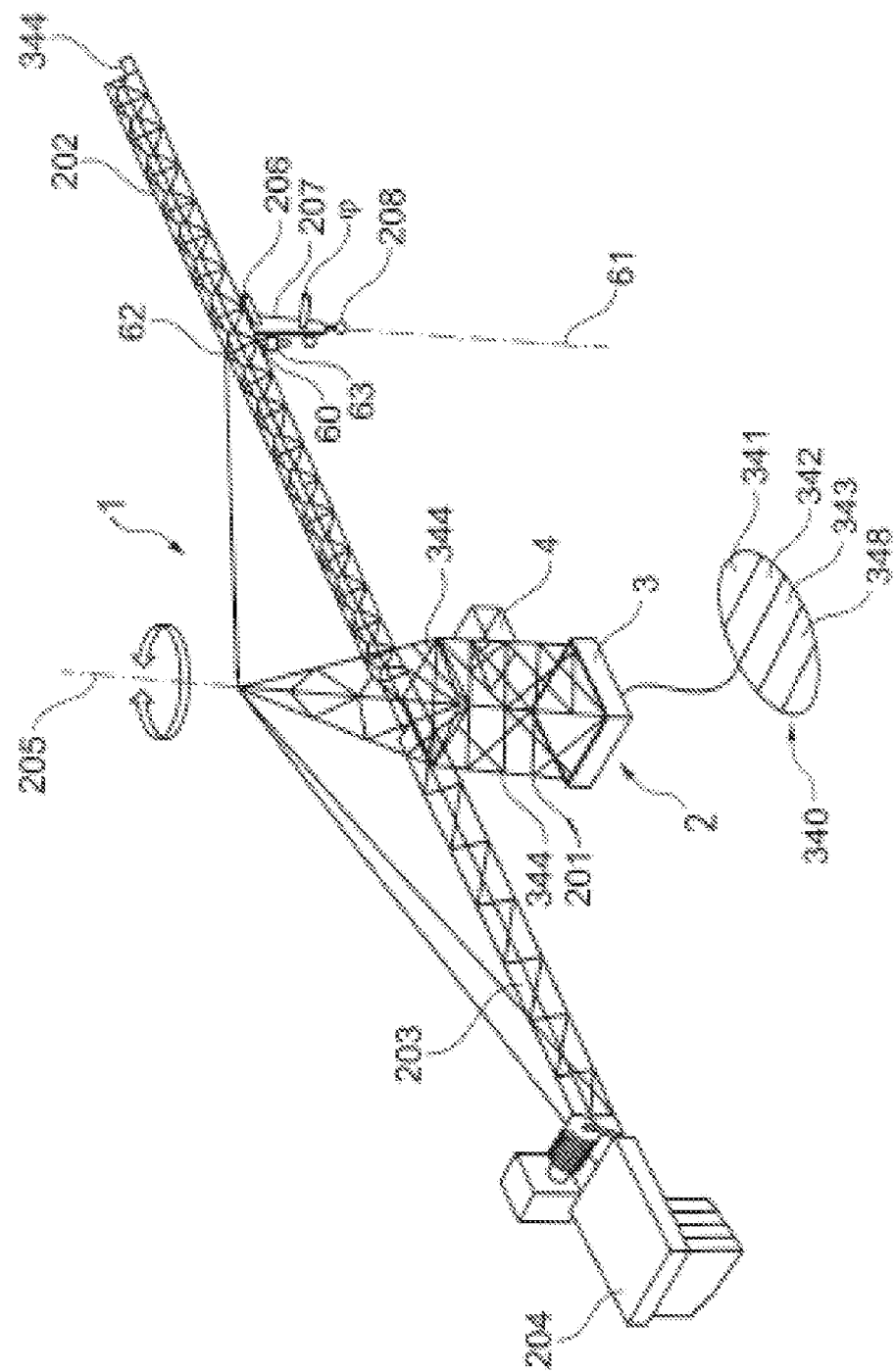
FIG. 1 illustrates a schematic representation of a revolving tower crane in which the lifting hook position and a cable angle with respect to the vertical are detected by an imaging sensor system and in which an pendulum damping device influences the control of the drive devices to prevent pendulum of the lifting hook and of its hoist cable.

As FIG. 1 shows, the crane can be configured as a revolving tower crane. The revolving tower crane shown in FIG. 1 can, for example, have a tower 201 in a manner known per se that carries a boom 202 that is balanced by a counter-boom 203 at which a counter-weight 204 is provided. Said boom 202 can be rotated by a slewing gear together with the counter-boom 203 about an upright axis of rotation 205 that can be coaxial to the tower axis. A trolley 206 can be traveled at the boom 202 by a trolley drive, with a hoist cable 207 to which a lifting hook 208 or load suspension component is fastened extending from the trolley 206.

As FIG. 10 further shows, the crane can be also configured as a bridge crane.

As FIG. 1 likewise shows, the crane 2 can—obviously also as well as a development as a bridge crane or another crane—here have an electronic control apparatus 3 that can comprise a control processor arranged at the crane itself. Said control apparatus 3 can here control different adjustment members, hydraulic circuits, electric motors, drive apparatus, and other pieces of working equipment at the respective construction machine. In the crane shown, they can, for example, be its hoisting gear, its slewing gear, its trolley drive, its boom luffing drive—where present—or the like.

Said electronic control apparatus 3 can here communicate with an end device 4 that can be arranged at the control station or in the operator's cab and can, for example, have the form of a tablet with a touchscreen and/or joysticks, rotary knobs, slider switches, and similar operating elements so that, on the one hand, different information can be displayed by the control processor 3 at the end device 4 and conversely control commands can be input via the end device 4 into the control apparatus 3.

Said control apparatus 3 of the crane 1 can in particular be configured also to control said drive apparatus of the hoisting gear, of the trolley, and of the slewing gear when an pendulum damping device 340 detects pendulum-relevant movement parameters.

For this purpose, the crane 1 can have an pendulum sensor system or detection unit 60 that detects an oblique pull of the hoist cable 207 and/or deflections of the lifting hook 208 with respect to a vertical line 61 that passes through the suspension point of the lifting hook 208, i.e. the trolley 206.

The cable pull angle φ can in particular be detected with respect to the line of gravity effect, i.e. the vertical line 62, cf. FIG. 1.

In this regard, the pendulum sensor 60 may have a camera 63 or other imaging sensor system attached to the trolley 206 that looks perpendicularly downwardly from the trolley 206 so that, with a non-deflected lifting hook 208, its image reproduction is at the center of the image provided by the camera 63. If, however, the lifting hook 208 is deflected with respect to the vertical line 61, for example by a jerky traveling of the trolley 206 or by an abrupt braking of the slewing gear, the image reproduction of the lifting hook 208 moves out of the center of the camera image, which can be determined by an image evaluation device 64.

On the other hand the oblique pull of the hoist cable or the deflection of the lifting hook with respect to the vertical can also be achieved with the aid of an inertial measurement unit IMU that is attached to the lifting hook 208 and that can preferably transmit its measurement signals wirelessly to a receiver at the trolley 206, cf. FIG. 10. The inertial measurement unit IMU and the evaluation of its acceleration signals and rotational rate signals will be explained in more detail below.

The control apparatus 3 can control the slewing gear drive and the trolley drive with the aid of the pendulum damping device 340 in dependence on the detected deflection with respect to the vertical 61, in particular while taking account of the direction and magnitude of the deflection, to again position the trolley 206 more or less exactly above the lifting hook 208 and to compensate or reduce pendulum movements or not even to allow them to occur.

The pendulum damping device 340 for this purpose comprises a structural dynamics sensor system 344 for determining dynamic deformations of structural components, wherein the regulator module 341 of the pendulum damping device 340 that influences the control of the drive device in an pendulum damping manner is configured to take account of the determined dynamic deformations of the structural components of the crane on the influencing of the control of the drive devices.

In this respect, an estimation device 343 can also be provided that estimates the deformations and movements of the machine structure under dynamic loads that result in dependence on control commands input at the control station and/or in dependence on specific control actions of the drive devices and/or in dependence on specific speed and/or acceleration profiles of the drive devices while taking account of circumstances characterizing the crane structure. A calculation unit 348 can in particular calculate the structural deformations and movements of the structural part resulting therefrom using a stored calculation model in dependence on the control commands input at the control station.

The pendulum damping device 340 advantageously detects such elastic deformations and movements of structural components under dynamic loads by means of the structural dynamics sensor system 344. Such a sensor system 344 can, for example, comprise deformation sensors such as strain gauges at the steel construction of the crane, for example the lattice structures of the tower 201 or of the boom 202. Alternatively or additionally, accelerometers and/or speed sensors and/or rotation rate sensors can be provided to detect specific movements of structural components such as pitching movements of the boom tip or rotational dynamic effects at the boom 202. Alternatively or additionally, such structural dynamics sensors can also be provided at the tower 201, in particular at its upper section at which the boom is supported, to detect the dynamics of the tower 201. Alternatively or additionally, motion sensors and/or acceleration sensors can be associated with the drivetrains to be able to detect the dynamics of the drivetrains. For example, rotary encoders can be associated with the pulley blocks of the trolley 206 for the hoist cable and/or with the pulley blocks for a guy cable of a luffing boom to be able to detect the actual cable speed at the relevant point.

Figure 2:
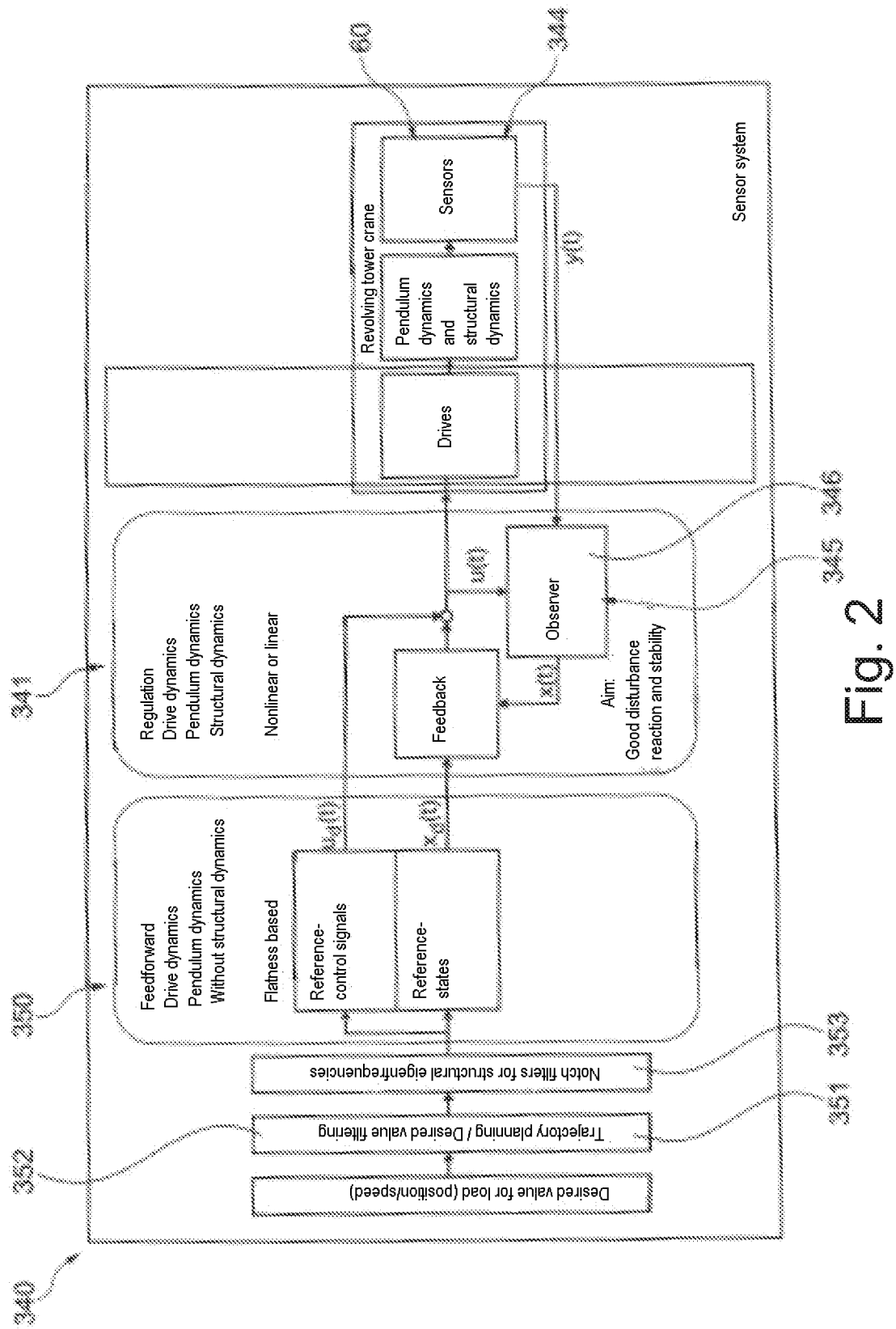
FIG. 2 illustrates a schematic representation of a regulation structure having two degrees of freedom of the pendulum damping device and the influencing of the control variables of the drive regulators carried out by it.

As FIG. 2 illustrates, the signals y (t) of the structural dynamics sensors 344 and the pendulum sensor system 60 are fed back to the regulator module 341 so that a closed feedback loop is implemented. Said regulator module 341 influences the control signals u (t) to control the crane drives, in particular the slewing gear, the hoisting gear, and the trolley drive in dependence on the fed back structural dynamics signals and pendulum sensor system signals.

As FIG. 2 shows, the regulator structure further comprises a filter device or an observer 345 that observes the fed back sensor signals or the crane reactions that are adopted with specific control variables of the drive regulators and that influences the control variables of the regulator while taking account of predetermined principles of a dynamic model of the crane that can generally have different properties and that can be acquired by analysis and simulation of the steel construction.

Such a filter device or observer device 345b can in particular be configured in the form of a so-called Kalman filter 346 to which the control variables u (t) of the drive regulators 347 of the crane and the fed back sensor signals y (t), i.e. the detected crane movements, in particular the cable pull angle φ with respect to the vertical 62 and/or its time change or the angular speed of said oblique pull, and the structural dynamic torsions of the boom 202 and of the tower 201 are supplied as input values and which influences the control variables of the drive regulators 347 accordingly from these input values using Kalman equations that model the dynamic system of the crane structure, in particular its steel components and drivetrains, to achieve the desired pendulum damping effect.

In particular deformations and sway forms of the revolving tower crane under load can be damped or avoided from the start by means of such a closed loop regulation, as is shown by way of example in FIG. 3, with the partial view a.) there initially schematically showing a pitching deformation of the revolving tower crane under load as a result of a deflection of the tower 201 with the accompanying lowering of the boom 202 and an oblique pull of the hoist cable linked thereto.

The partial views b.) and c.) of FIG. 3 further show by way of example in a schematic manner a transverse deformation of the revolving tower crane in a perspective representation and in a plan view from above with the deformations of the tower 201 and of the boom 202 occurring there.

Finally, FIG. 3 shows an oblique pull of the hoist cable linked to such transverse deformations in its partial views d.) and e.).

As FIG. 2 further shows, the regulator structure is configured in the form of a regulation having two degrees of freedom and comprises, in addition to said closed loop regulation with feedback of the pendulum sensor system signals and structural dynamics sensor signals, a feedforward or a feedforward control stage 350 that attempts not to allow any regulation errors at all to occur in the ideal case by a guiding behavior that is as good as possible.

Said feedforward 350 is advantageously configured as flatness based and is determined in accordance with the so-called differential flatness method, as already initially mentioned.

Since the deflections of the structural movements and also the pendulum movements are very small in comparison with the driven crane movements that represent the desired travel path, the structural dynamics signals and the pendulum movement signals are neglected for the determination of the feedforward signals $u_d$ (t) and $x_d$ (t), that is, the signals y (t) of the pendulum sensor system and the structural dynamics sensor system 60 and 344 respectively are not fed back to the feedforward module 350.

As FIG. 2 shows, desired values for the load-receiving means 208 are supplied to the feedforward module 350, with these desired values being able to be position indications and/or speed indications and/or path parameters for said load-receiving means 208 and defining the desired travel movement.

The desired values for the desired load position and their temporal derivations can in particular advantageously be supplied to a trajectory planning module 351 and/or to a desired value filter 352 by means of which a desired progression can be determined for the load position and for its first four time derivatives, from which the exact progression of the required control signals $u_d$ (t) for controlling the drives and the exact progression $u_d$ (t) of the corresponding system states can be calculated via algebraic equations in the feedforward model 350.

In order not to stimulate any structural movements by the feedforward, a notch filter device 353 can advantageously be connected upstream of the feedforward module 350 to correspondingly filter the input values supplied to the feedforward module 350, with such a notch filter device 353 in particular being able to be provided between said trajectory planning module 351 or the desired value filter module 352, on the one hand, and the feedforward module 350, on the other hand. Said notch filter device 353 can in particular be configured to eliminate the stimulated eigenfrequencies of the structural dynamics from the desired value signals supplied to the feedforward.

To reduce a sway dynamics or even to not allow them to arise at all, the pendulum damping device 340 can be configured to correct the slewing gear and the trolley chassis, and optionally also the hoisting gear, such that the cable is, where possible, always perpendicular to the load even when the crane inclines more and more to the front due to the increasing load torque.

For example, on the lifting of a load from the ground, the pitching movement of the crane as a consequence of its deformation under the load can be taken into account and the trolley chassis can be subsequently traveled while taking account of the detected load position or can be positioned using a forward-looking estimation of the pitch deformation such that the hoist cable is in a perpendicular position above the load on the resulting crane deformation. The greatest static deformation here occurs at the point at which the load leaves the ground. In a corresponding manner, alternatively or additionally, the slewing gear can also be subsequently traveled while taking account of the detected load position and/or can be positioned using a forward-looking estimation of a transverse deformation such that the hoist cable is in a perpendicular position above the load on the resulting crane deformation.

The model underlying the pendulum damping regulation can generally have different properties.

The decoupled observation of the dynamics in the pivot direction and within the tower boom plane is useful here for the regulation oriented mechanical modeling of elastic revolving cranes. The pivot dynamics are stimulated and regulated by the slewing gear drive while the dynamics in the tower boom plane are stimulated and regulated by the trolley chassis drive and the hoisting gear drive. The load oscillates in two directions—transversely to the boom (pivot direction) on the one hand, and in the longitudinal boom direction (radially) on the other hand. Due to the small hoist cable elasticity, the vertical load movement largely corresponds to the vertical boom movement that is small with revolving tower cranes in comparison with the load deflections due to the pendulum movement.

The portions of the system dynamics that are stimulated by the slewing gear and by the trolley chassis in particular have to be taken into account for the stabilization of the load pendulum movement. They are called pivot dynamics and radial dynamics respectively. As long as the pendulum angles are not zero, both the pivot dynamics and the radial dynamics can additionally be influenced by the hoisting gear. This is, however, negligible for a regulation design, in particular for the pivot dynamics.

The pivot dynamics in particular comprise steel structure movements such as tower torsion, transverse boom bend about the vertical axis, and the tower bend transversely to the longitudinal boom direction, and the pendulum dynamics transversely to the boom and the slewing gear drive dynamics. The radial dynamics comprises the tower bend in the boom direction, the pendulum dynamics in the boom direction, and, depending on the manner of observation, also the boom bend in the vertical direction. In addition, the drive dynamics of the trolley chassis and optionally of the hoisting gear are assigned to the radial dynamics.

A linear design method is advantageously targeted for the regulation and is based on the linearization of the nonlinear mechanical model equations about a position of rest. All the couplings between the pivot dynamics and the radial dynamics are dispensed with by such a linearization. This also means that no couplings are also taken into account for the design of a linear regulation when the model was first derived in a coupled manner. Both directions can be considered as decoupled in advance since this considerably simplifies the mechanical model formation. In addition, a clarified model in compact form is thus achieved for the pivot dynamics, with the model also being able to be quickly evaluated, whereby, on the one hand, computing power is saved and, on the other hand, the development process of the regulation design is accelerated.

To derive the pivot dynamics as a compact, clarified, and exact dynamic system model, the boom can be considered as an Euler-Bernoulli beam and thus first as a system with a distributed mass (distributed parameter system). Furthermore, the retroactive reaction of the hoisting dynamics on the pivot dynamics can additionally be neglected, which is a justified assumption for small pendulum angles due to the vanishing horizontal force portion. If large pendulum angles occur, the effect of the winch on the pivot dynamics can also be taken into account as a disruptive factor.

The boom is modeled as a beam in a moving reference system that rotates by the slewing gear drive at a rotational rate γ, as shown in FIG. 4.

Three apparent accelerations thus act within the reference system that are known as the Coriolis acceleration, the centrifugal acceleration, and the Euler acceleration. Since the reference system rotates about a fixed point, there results for each point $$r' = [r_x, r_y, r_z] \quad (1)$$

within the reference system, the apparent acceleration a' as $$a' = \underbrace{2\omega \times v'}_{Coriolis} - \underbrace{\dot{\omega} \times r'}_{Euler} - \underbrace{\omega \times (\omega \times r')}_{Zentrifugal}, \quad (2)$$

wherein × is the cross product, $$\omega = [0\ 0\ \dot{\gamma}]^T \quad (3)$$

is the rotation vector, and v' is the speed vector of the point relative to the rotating reference system.

Of the three apparent accelerations, only the Coriolis acceleration represents a bidirectional coupling between the pivot dynamics and the radial dynamics. This is proportional to the rotational speed of the reference system and to the relative speed. Typical maximum rotational rates of a revolving tower crane are in the range of approximately $$\dot{\gamma}_{MAX} \approx 0.1 \frac{rad}{s},$$

so that the Coriolis acceleration typically adopts small values in comparison with the driven accelerations of the revolving tower crane. The rotational rate is very small during the stabilization of the load pendulum damping at a fixed position; the Coriolis acceleration can be pre-planned and explicitly taken into account during large guidance movements. In both cases, the neglecting of the Coriolis acceleration therefore only results in small approximation errors so that it will be neglected in the following.

The centrifugal acceleration only acts on the radial dynamics in dependence on the rotational rate and can be taken account for it as a disruptive factor. It has hardly any effect on the pivot dynamics due to the slow rotational rates and can therefore be neglected. What is important, however, is the linear Euler acceleration that acts in the tangential direction and therefore plays a central role in the observation of the pivot dynamics.

The boom can be considered an Euler-Bernoulli beam due to the small cross-sectional area of the boom and to the small shear strains. The rotary kinetic energy of the beam rotation about the vertical axis is thus neglected. It is assumed that the mechanical parameters such as area densities and area moments of inertia of the Euler-Bernoulli approximation of the boom elements are known and can be used for the calculation.

Guying between the A block and the boom have hardly any effect on the pivot dynamics and are therefore not modeled here. Deformations of the boom in the longitudinal direction are likewise so small that they can be neglected. The non-damped dynamics of the boom in the rotating reference system can thus be given by the known partial differential equation $$\mu(x)\ddot{w}(x,t) + (EI(x)w''(x,t))'' = \tilde{q}(x,t) \quad (4)$$

for the boom deflection w(x, t) at the position x at the time t μ(x) is thus the area density, I(x) the area moments of inertia at the point x, E Young's modulus, and q̃(x, t) the acting distributed force on the boom. The zero point of the spatial coordinate x for this derivation is at the end of the counter-boom. The notation $$(\cdot)' = \frac{\partial(\cdot)}{\partial x}$$

describes the spatial differentiation here. Damping parameters are introduced at a later point.

To obtain a description of the boom dynamics in the inertial system, the Euler force is first separated from the distributed force, which leads to the partial differential equation $$\mu(x)(x-l_{cf})\ddot{\gamma}+\mu(x)\ddot{w}(x,t)+E(I(x)w''(x,t))''=q(x,t) \quad (5)$$

Here $l_{cf}$ is the length of the counter-boom and $q(x,t)$ is the actually distributed force on the boom without the Euler force. Both beam ends are free and not clamped. The marginal conditions $$w''(0,t)=0, w''(L,t)=0 \quad (6)$$

$$w'''(0,t)=0 \ w'''(L,t)=0 \quad (7)$$

with the total length L of the boom and the counter-boom thus apply.

A sketch of the boom is shown in FIG. 5. The spring stiffnesses $c_t$ and $c_b$ represent the torsion resistance or flexurally rigidity of the tower and will be explained in the following.

The tower torsion and the tower bend transversely to the boom direction are advantageously taken into account for the modeling of the pivot dynamics. The tower can initially be assumed as a homogeneous Euler-Bernoulli beam due to its geometry. The tower is represented at this point by a rigid body replacement model in favor of a simpler modeling. Only one eigenmode for the tower bend and one eigenmode for the tower torsion are considered. Since essentially only the movement at the tower tip is relevant for the pivot dynamics, the tower dynamics can be used by a respective mass spring system with a coinciding eigenfrequency as a replacement system for the bend or torsion. For the case of a higher elasticity of the tower, the mass spring systems can be supplemented more easily by further eigenmodes at this point in that a corresponding large number of masses and springs are added, cf. FIG. 6.

The parameters of spring stiffness $c_b$ and Masse $m_T$ are selected such that the deflection at the tip and the eigenfrequency agree with that of the Euler-Bernoulli beam that represents the tower dynamics. If the constant area moment of inertia $I_T$ the tower height $l_T$ and the area density $\mu_T$ are known for the tower, the parameters can be calculated from the static deflection at the beam end $$y_0 = \frac{F l_T^3}{3 E I_T} \quad (8)$$

and from the first eigenfrequency $$\omega_1 = \sqrt{\frac{12.362 E I_T}{\mu_T l_T^4}} \quad (9)$$

of a homogeneous Euler-Bernoulli beam analytically as $$c_b = \frac{F}{y_0} = \frac{3 E I_T}{l_T^3}, \quad m_T = \frac{c_b}{\omega_1^2} = \frac{3 \mu_T l_T}{12.362}. \quad (10)$$

A rigid body replacement model can be derived for the tower torsion in an analog manner with the inertia $J_T$ and the torsion spring stiffness $c_t$, as shown in FIG. 5.

If the polar area moment of inertia $I_P$, the torsion moment of inertia $J_T$ (that corresponds to the polar area moment of inertia for annular cross-sections), the mass density $\rho$ and the shear modulus G are known for the tower, the parameters of the replacement model can be determined as $$c_t = \frac{G J_T, T}{l_T}, \quad J_T = 0.405 \rho I_p l_T \quad (11)$$

to achieve a coinciding first eigenfrequency.

To take account of both the replacement mass $m_T$ and the replacement inertia $J_T$ in the form of an additive area density of the boom, the approximation of the inertia for slim objects can be used from which it follows that a slim beam segment of the length $$b = \sqrt{\frac{12 J_T}{m_T}} \quad (12)$$

has the mass $m_T$ and, with respect to its center of gravity the inertia $J_T$. I.e. the area density of the boom $\mu(x)$ is increased at the point of the tower clamping over a length of b by the constant value $$\frac{m_T}{b}.$$

Since the dimensions and inertia moments of the payloads of a revolving tower crane are unknown as a rule, the payload can still be modeled as a concentrated point mass. The cable mass can be neglected. Unlike the boom, the payload is influenced somewhat more by Euler forces, Coriolis forces, and centrifugal forces. The centrifugal acceleration only acts in the boom direction, that is, it is not relevant at this point; the Coriolis acceleration results with the distance $x_L$ of the load from the tower as $$a_{Coriolis,y} = 2\dot{\gamma}\dot{x}_L. \quad (13)$$

Due to the small rotational rates of the boom, the Coriolis acceleration on the load can be neglected, in particular when the load should be positioned. It is, however, still taken along for some steps to implement a disturbance feedforward.

To derive the pendulum dynamics, they are projected onto a tangential plane that is oriented orthogonally to the boom and that intersects the position of the trolley.

The Euler acceleration results as $$a_{Euler,L} = \ddot{\gamma} x_L. \quad (14)$$

The approximation $$x_L/x_{tr} \approx 1 \quad (15)$$

applies due to the pendulum angles, that are small as a rule, and the approximation $$a_{Euler,L} = a_{Euler} \quad (16)$$

follows from this that the Euler acceleration acts in approximately the same manner on the load and on the trolley due to the rotation of the reference system.

The acceleration on the load is shown in FIG. 7. Where $$s(t) = x_{tr}\gamma(t) + w(x_{tr}, t) \quad (17)$$

is the y position of the trolley in the tangential plane. The position of the trolley on the boom $x_{tr}$ is here approximated as a constant parameter due to the decoupling of the radial and pivot dynamics.

The pendulum dynamics can easily be derived using Lagrangian mechanics. For this purpose, the potential energy is first established $$U = m_L l(t) g \cos(\phi(t)) \quad (18)$$

with the load mass $m_L$, acceleration due to gravity g and the cable length l(t) and the kinetic energy $$T = \frac{1}{2} m_L \dot{r}^T \dot{r}, \quad (19)$$

wherein $$r(t) = \begin{bmatrix} s(t) + l(t)\sin(\phi(t)) \\ -l(t)\cos(\phi(t)) \end{bmatrix}. \quad (20)$$

is the y position of the load in the tangential plane. Using the Lagrange function $$L = T - U \quad (21)$$

and the Lagrange equations of the 2nd kind:

$$\frac{d}{dt}\frac{\partial L}{\partial \dot{\phi}} - \frac{\partial L}{\partial \phi} = Q \quad (22)$$

with the non-conservative Coriolis force $$Q = \begin{bmatrix} m_L a_{Coriolis,y} \\ 0 \end{bmatrix}^T \cdot \frac{\partial r}{\partial \phi} = m_L l a_{Coriolis,y} \cos(\phi) \quad (23)$$

the pendulum dynamics in the pivot direction follow as $$2\dot{\phi}\dot{l} + (\ddot{s} - a_{Coriolis,y})\cos\phi + g\sin\phi + \ddot{\phi}l = 0. \quad (24)$$

Linearized by $\phi = 0$, $\dot{\phi} = 0$ and while neglecting the cable length change $\dot{l} \approx 0$ and the Coriolis acceleration $a_{Coriolis,y} \approx 0$ the simplified pendulum dynamics $$\ddot{\phi} = \frac{-\ddot{s} - g\phi}{l} = \frac{-x_{tr}\ddot{\gamma} - \ddot{w}(x_{tr}, t) - g\phi}{l}. \quad (25)$$

The cable force $F_R$ has to be determined to describe the reaction of the pendulum dynamics to the structural dynamics of the boom and the tower. This is very simply approximated for this purpose by its main portion through acceleration due to gravity as $$F_{R,h} = m_L g \cos(\phi)\sin(\phi), \quad (26)$$

Its horizontal portion in the y-direction thus results as $$F_{R,h} = m_L g \cos(\phi)\sin(\phi), \quad (27)$$

or linearized by $\phi = 0$ as $$F_{R,h} = m_L g \phi. \quad (28)$$

The distributed parameter model (5) of the boom dynamics describes an infinite number of eigenmodes of the boom and is not yet suitable for a regulation design in form. Since only a few of the very low frequency eigenmodes are relevant for the observer and regulation, a modal transformation is suitable with a subsequent modal reduction in order to these few eigenmodes. An analytical modal transformation of equation (5) is, however, more difficult. It is instead suitable to first spatially discretize equation (5) by means of finite differences or the fine element method and thus to obtain a usual differential equation.

The beam is divided over N equidistantly distributed point masses at the boom positions on a discretization by means of the finite differences.

$$x_i, i \in [1 \ldots N] \quad (29)$$

The beam deflection at each of these positions is noted as $$w_i = w(x_i, t) \quad (30)$$

The spatial derivatives are approximated by the central difference quotient $$w'_i \approx \frac{-w_{i-1} + w_{i+1}}{2\Delta_x} \quad (31)$$

$$w''_i \approx \frac{w_{i-1} - 2w_i + w_{i+1}}{\Delta_x^2} \quad (32)$$

where $\Delta_x = x_{i+1} - x_i$ describes the distance of the discrete point masses and $w_i'$ describes the spatial derivative $w'(x_i, t)$.

For the discretization of $w''(x)$ the conditions (6)-(7)

$$w_{i-1} - 2w_i + w_{i+1} = 0, i \in \{1, N\} \quad (33)$$

$$-w_{i-2} + 2w_{i-1} - 2w_{i+1} + w_{i+2} = 0, i \in \{1, N\} \quad (34)$$

have to be solved for $w_{-1}$, $w_{-2}$, $w_{N+1}$ and $w_{N+2}$. The discretization of the term $(I(x)w'')''$ in equation (5) results as $$(I(x)w'')'' \approx \frac{\eta_{i-1} - 2\eta_i + \eta_{i+1}}{\Delta_x^2} \quad (35)$$

where $$\eta_i = I(x_i) w''_i. \quad (36)$$

Due to the selection of the central difference approximation, equation (35) depends on the margins of the values $I_{-1}$ and $I_{N+1}$, that can be replaced by the values $I_1$ and $I_N$ in practice.

Vector notation (bold printing) is suitable for the further procedure. The vector of the boom deflections is termed $$\vec{w} = [w_1 \ldots w_N]^T \quad (37)$$

so that the discretization of the term $(I(x)w'')''$ can be expressed as $$K_0 \vec{w} \quad (38)$$

with the stiffness matrix $$K_0 = \begin{pmatrix} I_1 + I_2 & -2I_1 - 2I_2 & I_1 + I_2 & 0 & 0 \\ -2I_2 & 4I_2 + I_3 & -2I_2 - 2I_3 & I_3 & 0 \\ I_2 & -2I_2 - 2I_3 & I_2 + 4I_3 + I_4 & -2I_3 - 2I_4 & I_4 \\ & & \ddots & & \\ 0 & I_{N-2} & -2I_{N-2} - 2I_{N-1} & I_{N-2} + 4I_{N-1} & -2I_{N-1} \\ 0 & 0 & I_{N-1} + I_N & -2I_{N-1} - 2I_N & I_{N-1} + I_N \end{pmatrix}$$

in vector notation.

The mass matrix of the area density (unit: kgm) is likewise defined as a diagonal matrix $$M_0 = \mathrm{diag}([\mu(x_1) \ldots \mu(x_N)]) \tag{39}$$

with the vector $$\vec{x}_T = [(x_1 - l_{cj}) \ldots (x_N - l_{cj})]^T \tag{40}$$

that describes the distance from the tower for every node. The vector $$\vec{q} = [q_1 \ldots q_N] \tag{41}$$

is defined with the entries $q_i = q(x_i)$ for the force acting in a distributed manner so that the discretization of the partial beam differential equation (5) can be given in discretized form as $$M_0 \ddot{\vec{w}} + \frac{E}{\Delta_x^4} K_0 = \vec{q} - M \vec{x}_T \ddot{y}. \tag{42}$$

The dynamic interaction of the steel structure movement and the pendulum dynamics will now be described.

For this purpose, the additional mass points on the boom, namely the counter-base mass $m_{cj}$, the replacement mass for the tower $m_T$ and the trolley mass $m_{tr}$ of the distributed mass matrix $$M_1 = M_0 + \mathrm{diag}\left(\left[\frac{M_{cj}}{\Delta_x} \ldots \frac{m_T}{b} \ldots \frac{m_T}{b} \ldots \frac{M_{tr}}{\Delta_x} \; 0\right]\right) \tag{43}$$

are added.

In addition, the forces and torques can be described by which the tower and load act on the boom. The force due to the tower bend is given via the replacement model by $$q_T \Delta_x = -c_b w(x_T). \tag{44}$$

with $q_T = q(l_{cj})$. The rotation of the boom beam at the clamping point $$\psi = w'_T = \frac{-w_{T-1} + w_{T+1}}{2\Delta_X} \tag{45}$$

is first required for the determination of the torque by the tower torsion and the torsion torque $$\tau = -c_T \frac{-w_T - 1 + w_T + 1}{2\Delta_X} \tag{46}$$

then results therefrom that can, for example, be approximated by two forces of equal amounts that engage (lever arm) equally far away from the tower. The value of these two forces is $$F_\tau = \frac{\tau}{2\Delta_X}, \tag{47}$$

when $\Delta x$ is respectively the lever arm. The torque can thereby be described by the vector $\vec{q}$ of the forces on the boom. Only the two entries $$q_{T-1}\Delta_x = -F_\tau, q_{T+1}\Delta_x = F_\tau, \tag{48}$$

have to be set for this purpose.

The entry $$q_{tr}\Delta_x = m_L g \phi \tag{49}$$

in $\vec{q}$ results through the horizontal cable force (28).

Since thus all the forces now depend on $\phi$ or $\vec{w}$ the coupling of the structure dynamics and pendulum dynamics can be written as $$\underbrace{\begin{bmatrix} M_0 & 0 \\ x_{tr}^T & 1 \end{bmatrix}}_{M} \underbrace{\begin{bmatrix} \ddot{\vec{w}} \\ \ddot{\phi} \end{bmatrix}}_{\ddot{\vec{x}}} + \underbrace{\begin{bmatrix} \left(\frac{E}{\Delta_x^4} K_0 + K_1\right) & F_{tr} \\ 0 & g \end{bmatrix}}_{K} \underbrace{\begin{bmatrix} \vec{w} \\ \phi \end{bmatrix}}_{\vec{x}} = \underbrace{\begin{bmatrix} -MX_T \\ -x_{tr} \end{bmatrix}}_{B} \ddot{y} \tag{50}$$

where $$K_1 = \frac{1}{4\Delta_x^3} \begin{bmatrix} \ldots & & & \\ & c_T & 0 & -c_T \\ & 0 & 4\Delta_x^2 c_b & 0 \\ & -c_T & 0 & c_T \\ & & & & \ldots \end{bmatrix}, \tag{51}$$

$$F_{tr} = \frac{1}{\Delta_x}[0 \ldots -m_L g \ldots 0]^T \tag{52}$$

and $$x_{tr} = [0 \ldots 1 \ldots 0]^T \text{ sodass } \dot{w}(x_{tr}, t) = x_{tr}^T \ddot{\vec{w}} \tag{53}$$

It must be noted at this point that the three parameters position of the trolley on the boom $x_{tr}$, hoist cable length l and load mass $m_L$ vary in ongoing operation. (50) is therefore a linear parameter varying differential equation whose specific characterization can only be determined, in particular online, during running. This must be considered in the later observer design and regulation design.

The number of discretization points N should be selected large enough to ensure a precise description of the beam deformation and the beam dynamics. (50) thus becomes a large differential equation system. However, a modal order reduction is suitable for the regulation to reduce the large number of system states to a lower number.

The modal order reduction is one of the most frequently used reduction processes. The basic idea comprises first carrying out a modal transformation, that is, giving the dynamics of the system on the basis of the eigenmodes (forms) and the eigenfrequencies. Then only the relevant eigenmodes (as a rule the ones with the lowest frequencies) are subsequently selected and all the higher frequency modes are neglected. The number of eigenmodes taken into account will be characterized by $\xi$ in the following.

The eigenvectors $\vec{v}_i$ must first be calculated with $i \in [1, N+1]$ that together with the corresponding eigenfrequencies $\omega_i$ satisfy the eigenvalue problem $$K\vec{v}_i = \omega_i^2 M \vec{v}_i \tag{54}$$

This calculation can be easily solved using known standard methods. The eigenvectors are thereupon written sorted by increasing eigenfrequency in the modal matrix $$V = [\vec{v}_1 \vec{v}_2 \ldots] \tag{55}$$

The modal transformation can then be carried out using the calculation $$\ddot{z} + \underbrace{V^{-1} M^{-1} KV}_{\tilde{K}} z = \underbrace{V^{-1} M^{-1} B}_{\tilde{B}} \ddot{y} \tag{56}$$

where the new state vector $\vec{z}(t)=V^{-1}\vec{x}(t)$ contains the amplitudes and the eigenmodes. Since the modally transformed stiffness matrix $\hat{K}$ has a diagonal form, the modally reduced system can simply be obtained by restriction to the first $\xi$ (columns and rows of this system as $$\ddot{z}_r+\hat{D}_r\dot{z}_r+\hat{K}_rz_r=\hat{B}_r\ddot{\gamma}. \tag{57}$$

where the state vector $\vec{z}_r$ now only describes the small number $\xi$ modal amplitudes. In addition, the entries of the diagonal damping matrix $\hat{D}_r$ can be determined by experimental identification.

Three of the most important eigenmodes are shown in FIG. 8. The topmost describes the slowest eigenmode that is dominated by the pendulum movement of the load. The second eigenmode shown has a clear tower bend while the boom bends even more clearly in the third representation. All the eigenmodes whose eigenfrequencies can be stimulated by the slewing gear drive should continue to be considered.

The dynamics of the slewing gear drive are advantageously approximated as a PT1 element that has the dynamics $$\ddot{\gamma} = \frac{u-\dot{\gamma}}{T_\gamma} \tag{58}$$

with the time constant $T_\gamma$. In conjunction with equation (57), $$\dot{x} = \underbrace{\begin{bmatrix} 0 & I & 0 & 0 \\ -\hat{K}_r & -\hat{D}_r & 0 & \frac{-\hat{B}_r}{T_\gamma} \\ 0 & 0 & 0 & 1 \\ 0 & 0 & 0 & \frac{-1}{T_\gamma} \end{bmatrix}}_{A} x + \underbrace{\begin{bmatrix} 0 \\ \frac{\hat{B}_r}{T_\gamma} \\ 0 \\ \frac{1}{T_\gamma} \end{bmatrix}}_{B} u \tag{59}$$

thus results with the new state vector $\vec{x}=[z_r \ \dot{z}_r \ \gamma \ \dot{\gamma}]^T$ and the control signal u of the desired speed of the slewing gear.

The system (59) can be supplemented for the observer and the regulation of the pivot dynamics by output vector $\vec{y}$ as $$\dot{\vec{x}}=A\vec{x}+Bu \tag{60}$$

$$\vec{y}=C\vec{x} \tag{61}$$

so that the system is observable, i.e. all the states in the vector $\vec{x}$ can be reconstructed by the outputs $\vec{y}$, and by an infinite number of time derivations of the outputs and can thus be estimated during running.

The output vector $\vec{y}$ here exactly describes the rotational rates, the strains, or the accelerations that are measured by the sensors at the crane.

can, for example, be designed on the basis of the model (61), with the value $$\dot{\hat{x}}=A\hat{x}+B\vec{u}+PC^TR^{-1}R^{-1}(\vec{y}-C\hat{\vec{x}})\hat{\vec{x}}(0)=\hat{\vec{x}} \tag{62}$$

from the algebraic Riccati equation P $$0=PA+PA^T+Q-PC^TR^{-1}CP \tag{63}$$

being able to follow that can be easily solved using standard methods. Q and R represent the covariance matrixes of the process noise and measurement noise and serve as interpretation parameters of the Kalman filter.

Since equations (60) and (61) describe a parameter varying system, the solution P of equation (63) always only applies to the corresponding parameter set $\{x_{tr}, l, m_L\}$. The standard methods for solving algebraic Riccati equations are, however, very processor intensive. In order not only to have to evaluate equation (63) during the running, the solution P can be pre-calculated offline for a finely resolved characterizing field in the parameters $x^{tr}, l, m_L$. That value is then selected from the characterizing field during running (online) whose parameter set $\{x_{tr}, l, m_L\}$ is closest to the current parameters.

Since all the system states $\hat{\vec{x}}$ can be estimated by the observer 345, the regulation can be implemented in the form of a feedback $$u=K(i_fx) \tag{64}$$

The vector $\vec{x}_{ref}$ here contains the desired states that are typically all zero (except for the angle of rotation $\gamma$) in the state of rest. The values can be unequal to zero during the traveling over a track, but should not differ too much from the state of rest by which the model was linearized.

A linear-quadratic approach is, for example, suitable for this purpose in which the feedback gain K is selected such that the power function $$J=\int_{t=0}^{\infty}x^TQx+u^TRudt \tag{65}$$

is optimized. The optimum feedback gain for the linear regulation design results as $$K=R^{-1}B^TP, \tag{66}$$

with P being able to be determined in an analog manner to the Kalman filter using the algebraic Riccati equation $$0=PA+A^TP-PBR^{-1}B^TP+Q \tag{67}$$

Since the gain K in equation (66) is dependent on the parameter set $\{x_{tr}, l, m_L\}$, a characterizing field is generated in an analog manner to the procedure for the observer. In the context of the regulation, this approach is known under the term gain scheduling.

The observer dynamics (62) can be simulated on a control device during running for the use of the regulation on a revolving tower crane. For this purpose, on the one hand, the control signals u of the drives and, on the other hand, the measurement signals $\vec{y}$ of the sensors can be used. The control signals are in turn calculated from the feedback gain and from the estimated state vector in accordance with (62).

Since the radial dynamics can equally be represented by a linear model of the form (60)-(61), an analog procedure as for the pivot dynamics can be followed for the regulation of the radial dynamics. Both regulations then act independently of one another on the crane and stabilize the pendulum dynamics in the radial direction and transversely to the boom, in each case while taking account of the drive dynamics and structural dynamics.

An approach for modeling the radial dynamics will be described in the following. It differs from the previously described approach for modeling the pivot dynamics in that the crane is now described by a replacement system of a plurality of coupled rigid bodies and no longer by continuous beams. In this respect, the tower can be divided into two rigid bodies, with a further rigid body being able to represent the boom, cf. FIG. 9.

$\alpha_y$ and $\beta_y$ here describe the angles between the rigid bodies and $\phi_y$ describes the radial pendulum angle of the load. The positions of the centers of gravity are described by P where the index CJ stands for the counter-boom, J for the boom, TR for the trolley, and T for the tower (in this case the upper rigid body of the tower). The positions here at least partly depend on the values $x_{TR}$ and l provided by the drives. Springs having the spring stiffnesses $\tilde{c}_{\alpha_y}$, $\tilde{c}_{\beta_y}$ and dampers whose viscous friction is described by the parameters day $d_{\alpha y}$ and $d_{\beta y}$ are located at the joints between the rigid bodies.

The dynamics can be derived using the known Lagrangian mechanics. Three degrees of freedom are here combined in the vector.

$$\vec{q} = (\alpha_y, \beta_y, \phi_y)$$

The translatory kinetic energies $$T_{kin} = \tfrac{1}{2}(m_T \|\dot{P}_T\|_2^2 + m_J \|\dot{P}_J\|_2^2 + m_{CJ} \|\dot{P}_{CJ}\|_2^2 + m_{TR} \|\dot{P}_{TR}\|_2^2 + m_L \|\dot{P}_L\|_2^2)$$

and the potential energies based on gravity and spring stiffnesses $$T_{pot} = g(m_T P_{T,z} + m_J P_{J,z} + m_{CJ} P_{CJ,z} + m_{TR} P_{TR,z} + m_L P_{L,z}) + \tfrac{1}{2}(\tilde{c}_{\alpha_y} \alpha_y^2 + \tilde{c}_{\beta_y} \beta_y^2)$$

can be expressed by them. Since the rotational energies are negligibly small in comparison with the translatory energies, the Lagrange function can be formulated as $$L = T_{kin} - T_{pot}$$

The Euler-Lagrange equations $$\frac{d}{dt} \frac{\partial L}{\partial \dot{q}_i} - \frac{\partial L}{\partial q_i} = Q_i^*$$

result therefrom having the generalized forces $Q_i^*$, that describe the influences of the non-conservative forces, for example the damping forces. Written out, the three equations $$\frac{d}{dt} \frac{\partial L}{\partial \dot{\alpha}_y} - \frac{\partial L}{\partial \alpha_y} = -d_{\alpha\gamma} \dot{\alpha}_y, \tag{68}$$

$$\frac{d}{dt} \frac{\partial L}{\partial \dot{\beta}_y} - \frac{\partial L}{\partial \beta_y} = -d_{\beta y} \dot{\beta}_y, \tag{69}$$

$$\frac{d}{dt} \frac{\partial L}{\partial \dot{\phi}_y} - \frac{\partial L}{\partial \phi_y} = 0. \tag{70}$$

result.

Very large terms result in these equations by the insertion of L and the calculation of the corresponding derivatives so that an explicit representation is not sensible here.

The dynamics of the drives of the trolley and of the hoisting gear can as a rule be easily approximated by the 1st order PT1 dynamics $$\ddot{x}_{TR} = \frac{1}{\tau_{TR}} (u_x - \dot{x}_{TR}), \tag{71}$$

$$\dot{l} = \frac{1}{\tau_l} (u_l - l). \tag{72}$$

$\tau_i$ describes the corresponding time constants and $u_i$ describes the desired speeds therein.

If now all the drive relevant variables are held in the vector $$x_a = (x_{TR}, l, \dot{x}_{TR}, \dot{l}, \ddot{x}_{TR}, \ddot{l}) \tag{73}$$

the coupled radial dynamics from the drive dynamics, pendulum dynamics, and structural dynamics can be represented as $$\underbrace{\begin{pmatrix} a_{11}(q, \dot{q}, x_a) & a_{12}(q, \dot{q}, x_a) & a_{13}(q, \dot{q}, x_a) \\ a_{31}(q, \dot{q}, x_a) & a_{22}(q, \dot{q}, x_a) & a_{23}(q, \dot{q}, x_a) \\ a_{31}(q, \dot{q}, x_a) & a_{32}(q, \dot{q}, x_a) & a_{33}(q, \dot{q}, x_a) \end{pmatrix}}_{\tilde{A}(X)} \ddot{q} = \underbrace{\begin{pmatrix} b_1(q, \dot{q}, x_a) \\ b_2(q, \dot{q}, x_a) \\ b_3(q, \dot{q}, x_a) \end{pmatrix}}_{\tilde{B}(X)} \tag{74}$$

or by conversion during running as the nonlinear dynamics in the form $$\ddot{q} = = f(\dot{q}, q, x_a) \tag{75}$$

Since the radial dynamics are thus present in minimal coordinates, an order reduction is not required. However, due to the complexity of the equations described by (75), an analytical offline pre-calculation of the Jacobi matrix $$\frac{\partial f}{\partial [\dot{q}, q]}$$

is not possible. To obtain a linear model of the form (60) for the regulation from (75), a numerical linearization can therefore be carried out while running. The state of rest $(\dot{q}_0, q_0)$ for which $$0 = f(\dot{q}0, q_0, 0) \tag{76}$$

is satisfied can first be determined for this purpose. The model can then be linearized using the equations $$\dot{x}_{lin} = \underbrace{\frac{\partial f}{\partial [\dot{q}, q]}\bigg|_{(\dot{q}_0, q_0)}}_{A} x_{lin} + \underbrace{\frac{\partial f}{\partial u}\bigg|_{(\dot{q}_0, q_0)}}_{B} u. \tag{77}$$

and a linear system as in equation (60) results. A measurement output (61), by which the radial dynamics can be observed, results, for example with the aid of gyroscopes, by the selection of a suitable sensor system for the structural dynamics and pendulum dynamics.

The further procedure of the observer design and regulation design corresponds to that for the pivot dynamics.

As already mentioned, the deflection of the hoist cable with respect to the vertical 62 cannot only be determined by an imaging sensor system at the trolley, but also by an inertial measurement unit at the lifting hook.

Such an inertial measurement unit IMU can in particular have acceleration and rotational rate sensor means for providing acceleration signals and rotational rate signals that indicate, on the one hand, translatory accelerations along different spatial axes and, on the other hand, rotational rates or gyroscopic signals with respect to different spatial axes. Rotational speeds, but generally also rotational accelerations, or also both, can here be provided as rotational rates.

The inertial measurement unit IMU can advantageously detect accelerations in three spatial axes and rotational rates about at least two spatial axes. The accelerometer means can be configured as working in three axes and the gyroscope sensor means can be configured as working in two axes.

The inertial measurement unit IMU attached to the lifting hook can advantageously wirelessly transmit its acceleration signals and rotational rate signals and/or signals derived therefrom to the control and/or evaluation device 3 or its pendulum damping device 340 that can be attached to a structural part of the crane or that can also be arranged separately close to the crane. The transmission can in particular take place to a receiver REC that can be attached to the trolley 206 and/or to the suspension from which the hoist cable runs off. The transmission can advantageously take place via a wireless LAN connection, for example, cf. FIG. 10.

As FIG. 13 shows, the lifting hook 208 can tilt in different directions and in different manners with respect to the hoist cable 207 in dependence on the connection. The oblique pull angle β of the hoist cable 207 does not have to be identical to the alignment of the lifting hook. Here, the tilt angle $\varepsilon_\beta$ describes the tilt or the rotation of the lifting hook 208 with respect to the oblique pull β of the hoist cable 207 or the rotation between the inertial coordinates and the lifting hook coordinates.

For the modeling of the pendulum behavior of a crane, the two pendulum directions in the travel direction of the trolley, i.e. in the longitudinal direction of the boom, on the one hand, and in the direction of rotation or of arc about the tower axis, i.e. in the direction transversely to the longitudinal direction of the boom, can be observed separately from one another since these two pendulum movements hardly influence one another. Every pendulum direction can therefore be modeled in two dimensions.

If the model shown in FIG. 12 is looked at, the pendulum dynamics can be described with the aid of the Lagrange equations. In this respect, the trolley position $s_x(t)$, the cable length $l(t)$ and the cable angle or pendulum angle $\beta(t)$ are defined in dependence on the time t, with the time dependence no longer being separately given by the term (t) in the following for reasons of simplicity and better legibility. The lifting hook position can first be defined in inertial coordinates as $$r = \begin{pmatrix} s_x - l\sin(\beta) \\ -l\cos(\beta) \end{pmatrix} \quad (101)$$

where the time derivative $$\dot{r} = \begin{pmatrix} \dot{s}_x - \dot{l}\sin(\beta) - l\dot{\beta}\cos(\beta) \\ l\dot{\beta}\sin(\beta) - \dot{l}\cos(\beta) \end{pmatrix} \quad (102)$$

describes the inertial speed using $$\frac{d\beta}{dt} = \dot{\beta}$$

The hook acceleration $$\ddot{r} = \begin{pmatrix} \ddot{s}_x - 2\dot{\beta}\dot{l}\cos\beta - \ddot{l}\sin\beta + l\dot{\beta}^2\sin\beta - l\ddot{\beta}\cos\beta \\ 2l\dot{\beta}\sin\beta - \ddot{l}\cos\beta + l\dot{\beta}^2\cos\beta + l\ddot{\beta}\sin\beta \end{pmatrix} \quad (103)$$

is not required for the derivation of the load dynamics, but is used for the design of the filter, as will still be explained.

The kinetic energy is determined by $$T = \tfrac{1}{2}m\dot{r}^T\dot{r} \quad (104)$$

where the mass m of the lifting hook and of the load are later eliminated. The potential energy as a result of gravity corresponds to $$V = mr^T g, g = (0 - g)^T, \quad (105)$$

With the acceleration due to gravity g.

Since V does not depend on $\dot{r}$ the Euler-Lagrange equation reads $$\frac{d}{dt}\frac{\partial T}{\partial \dot{q}} - \frac{\partial T}{\partial q} + \frac{\partial V}{\partial q} = 0 \quad (106)$$

where the vector $q = [\beta \ \dot{\beta}]^T$ describes the generalized coordinates. This produces the pendulum dynamics as a second order nonlinear differential equation with respect to β, $$l\ddot{\beta} + 2\dot{l}\dot{\beta} - \ddot{s}_x \cos\beta + g \sin\beta = 0. \quad (107)$$

The dynamics in the y-z plane can be expressed in an analog manner.

In the following, the acceleration $\ddot{s}_x$ of the trolley or of a portal crane runner will be observed as a known system input value. This can sometimes be measured directly or on the basis of the measured trolley speed. Alternatively or additionally, the trolley acceleration can be measured or also estimated by a separate trolley accelerometer if the drive dynamics is known. The dynamic behavior of electrical crane drives can be estimated with reference to the first order load behavior $$\ddot{s}_x = \frac{u_x - \dot{x}}{T_x} \quad (108)$$

where the input signal $u_x$ corresponds to the desired speed and $T_x$ is the time constant. With sufficient accuracy, no further measurement of the acceleration is required.

The tilt direction of the lifting hook is described by the tilt angle $\varepsilon_\beta$ cf. FIG. 13.

Since the rotational rate or tilt speed is measured gyroscopically, the model underlying the estimate of the tilt corresponds to the simple integrator $$\dot{\varepsilon}_\beta = \omega_\beta \quad (109)$$

of the measured rotational rate $\omega_\beta$ to the tilt angle.

The IMU measures all the signals in the co-moving, co-rotating body coordinate system of the lifting hook, which is characterized by the preceding index K while vectors in inertial coordinates are characterized by I or also remain fully without an index. As soon as $\varepsilon_\beta$ has been estimated, the measured acceleration $_K a = [_K\alpha_x \ _K\alpha_z]_T$ can be transformed into lifting hook coordinates as $_K a$ and indeed using $$_I a = \begin{bmatrix} \cos(\varepsilon_\beta) & \sin(\varepsilon_\beta) \\ -\sin(\varepsilon_\beta) & \cos(\varepsilon_\beta) \end{bmatrix} \cdot {_K a}. \quad (110)$$

The inertial acceleration can then be used for estimating the pendulum angle on the basis of (107) and (103).

The estimate of the cable angle β requires an exact estimate of the tilt of the lifting hook $\varepsilon_\beta$. To be able to estimate this angle on the basis of the simple model in accordance with (109), an absolute reference value is required since the gyroscope has limited accuracy and an output value is unknown. In addition, the gyroscopic measurement will as a rule be superposed by an approximately constant deviation that is inherent in the measurement principle. It can furthermore also not be assumed that $\varepsilon_\beta$ generally oscillates around zero. The accelerometer is therefore used to provide such a reference value in that the acceleration due to gravity constant (that occurs in the signal having a low frequency) is evaluated and is known in inertial coordinates as $$_I g = [0 - g]^T. \tag{111}$$

and can be transformed in lifting hook coordinates $$_K g = -g[-\sin(\varepsilon_\beta) \cos(\varepsilon_\beta)]^T. \tag{112}$$

The measured acceleration results as the sum of (103) and (112)

$$_K a = _K \ddot{r} - _K g. \tag{113}$$

The negative sign of $_K g$ here results from the circumstance that the acceleration due to gravity is measured as a fictitious upward acceleration due to the sensor principle.

Since all the components of $_K \ddot{r}$ are generally significantly smaller than g and oscillate about zero, the use of a lowpass filter having a sufficiently low masking frequency permits the approximation $$_K a \approx -_K g. \tag{114}$$

If the x component is divided by the z component, the reference tilt angle for low frequencies is obtained as $$\varepsilon_{\beta,a} = \arctan\left(\frac{_K a_x}{_K a_z}\right). \tag{115}$$

The simple structure of the linear pendulum dynamics in accordance with (109) permits the use of various filters to estimate the orientation. One option here is a so-called continuous time Kalman Bucy filter that can be set by varying the method parameters and a noise measurement. A complementary filter as shown in FIG. 14 is, however, used in the following that can be set with respect to its frequency characteristic by a selection of the highpass and lowpass transfer functions.

As the block diagram of FIG. 14 shows, the complementary filter can be configured to estimate the direction of the lifting hook tilt $\varepsilon_\beta$. A highpass filtering of the gyroscope signal $\omega_\beta$ with $G_{hp1}(s)$ produces the offset-free rotational rate $\bar{\omega}_\beta$ and, after integration, a first tilt angle estimate $\varepsilon_{\beta,\omega}$. The further estimate $\varepsilon_{\beta,a}$ originates from the signal $_K a$ of the accelerometer.

A simple highpass filter having the transfer function $$G_{hp1} = \frac{s}{s + \omega_o} \tag{116}$$

and a very low masking frequency $\omega_o$ can in particular first be used on the gyroscope signal $\omega_\beta$ to eliminate the constant measurement offset. Integration produces the gyroscope based tilt angle estimate $\varepsilon_{\beta,\omega}$ that is relatively exact for high frequencies, but is relatively inexact for low frequencies. The underlying idea of the complementary filter is to sum up, $\varepsilon_{\beta,\omega}$ and $\varepsilon_{\beta,\alpha}$ or to link them to one another, with the high frequencies of $\varepsilon_{\beta,\omega}$ being weighted more by the use of the highpass filter and the low frequencies $\varepsilon_{\beta,\alpha}$ being weighted more by the use of the lowpass filter since (115) represents a good estimate for low frequencies. The transfer functions can be selected as simple first order filters, namely $$G_{hp2}(s) = \frac{s}{s + \omega}, \; G_{lp}(s) = \frac{\omega}{s + \omega} \tag{117}$$

where the masking frequency $\omega$ is selected as lower than the pendulum frequency. Since $$G_{hp2}(s) + G_{lp}(s) = 1 \tag{118}$$

applies to all the frequencies, the estimate of $\varepsilon_\beta$ is not incorrectly scaled.

The inertial acceleration $_I a$ of the lifting hook can be determined on the basis of the estimated lifting hook orientation from the measurement of $_K a$ and indeed while using (110), which permits the design of an observer on the basis of the pendulum dynamics (107) as well as the rotated acceleration measurement $$_I a = \ddot{r} - _I g. \tag{119}$$

Although both components of this equation can equally be used for the estimate of the pendulum angle, good results can also be obtained only using the x component that is independent of g.

It is assumed in the following that the pendulum dynamics are superposed by process-induced background noise w:N(0,Q) and measurement noise v:N(0,R) so that it can be expressed as a nonlinear stochastic system, namely $$\dot{x} = f(x,u) + w, x(0) = x_0 \tag{120}$$

$$y = h(x,u) + v$$

where $x = [\beta \; \dot{\beta}]^T$ is the status vector. The continuous, time extended Kalman filter $$\dot{\hat{x}} = f(\hat{x}, u) + K(y - h(\hat{x}, u)), \hat{x}(0) = \hat{x}_0, \tag{121}$$

$$\dot{P} = AP + PA^T - PC^T R^{-1} CP + Q, P(0) = P_0,$$

$$K = PC^T R^{-1},$$

$$A = \left.\frac{\partial f}{\partial x}\right|_{\hat{x},u}, C = \left.\frac{\partial h}{\partial x}\right|_{\hat{x},u},$$

can be used to determine the states.

The spatial state representation of the pendulum dynamics in accordance with (107) here reads $$f(x, \ddot{s}_x) = \begin{bmatrix} \dot{\beta} \\ -\frac{1}{l}(2\dot{l}\dot{\beta} - \ddot{s}_x \cos\beta + g\sin\beta) \end{bmatrix} \tag{122}$$

where the trolley acceleration $u = \ddot{s}_x$ is treated as the input value of the system. The horizontal component of the lifting hook acceleration from (119) can be formulated in dependence on the system states to define a system output, from which there results:

$$_I a_x = \ddot{r}_x - \underbrace{_I g_x}_{0} \tag{123}$$

$$= \ddot{s}_x - 2\dot{\beta}\dot{l}\cos\beta - \ddot{l}\sin\beta + l\dot{\beta}^2\sin\beta - l\ddot{\beta}\cos\beta$$

$$= (1 - \cos(\beta)^2)\ddot{s}_x + \sin\beta(-\ddot{l} + g\cos\beta + l\dot{\beta}^2)$$

The horizontal component $_Ig_x$ of the acceleration due to gravity is here naturally zero. In this respect $\dot{l},\ddot{l}$ can be reconstructed from the measurement of l for example using the drive dynamics (108). When using (123) as the measurement function $$h(x) = {}_I a_x, \quad (124)$$

the linearization term results as $$A = \begin{bmatrix} 0 & 1 \\ \frac{(-g\cos\beta - \ddot{s}_x \sin\beta)}{l} & \frac{-2\dot{l}}{l} \end{bmatrix}\Big|_{\hat{x},\hat{s}_x}, \quad (125)$$

$$C = \begin{bmatrix} \cos\beta(2g\cos\beta - \ddot{l} + l\dot{\beta}^2 + 2\ddot{s}_x \sin\beta) - g \\ 2l\dot{\beta}\sin\beta \end{bmatrix}^T\Big|_{\hat{x},\hat{s}_x}. \quad (126)$$

Here, the covariance matrix estimate of the process noise is $Q=I_{2\times 2}$, the covariance matrix estimate of the measurement noise is $R=1000$ and the initial error covariance matrix is $P=0_{2\times 2}$ As FIG. 15 shows, the pendulum angle that is estimated by means of an extended Kalman filter (EKF) or is also determined by means of a simple static approach corresponds very much to a validation measurement of the pendulum angle at a Cardan joint by means of a slew angle encoder at the trolley.

It is interesting here that the calculation by means of a relatively simple static approach delivers comparably good results as the extended Kalman filter. The pendulum dynamics in accordance with (122) and the output equation in accordance with (123) can therefore be linearized around the stable state $\beta=\dot{\beta}=0$. If the cable length l is furthermore assumed as constant so that $\dot{l}=\ddot{l}=0$, results for the linearized system $$\dot{x} = \begin{bmatrix} 0 & 1 \\ \frac{-g}{l} & 0 \end{bmatrix} x + \begin{bmatrix} 0 \\ \frac{1}{l} \end{bmatrix} \ddot{s}_x, \quad (127)$$

$$y = [g\,0] x \quad (128)$$

and $_I a_x$ serves as the reference value for the output. While neglecting the dynamic effects in accordance with (127) and while taking account of only the static output function (128), the pendulum angle can be acquired from the simple static relationship $$\beta = \frac{{}_I a_x}{g} \quad (129)$$

that is interestingly independent of l. FIG. 15 shows that the results hereby acquired are just as exact as those of the Kalman filter.

Using $\beta$ and equation (101), an exact estimate of the load position can thus be achieved.

When modeling the dynamics of the speed based crane drives in accordance with (108) accompanied by a parameter determination, the resulting time constants in accordance with $$T_i < \frac{1}{50}$$

become very small. Dynamic effects of the drives can be neglected to this extent.

To give the pendulum dynamics with the drive speed $\dot{s}_x$ instead of the drive acceleration $\ddot{s}_x$ as the system input value, the linearized dynamic system in accordance with (127) can be "increased" by integration, from which $$\dot{\tilde{x}} = \begin{bmatrix} 0 & 1 \\ \frac{-g}{l} & 0 \end{bmatrix} \underbrace{\int_0^\tau x(\tau)d\tau}_{\tilde{x}} + \begin{bmatrix} 0 \\ \frac{1}{l} \end{bmatrix} \dot{s}_x \quad (130)$$

results. The new status vector here is $\tilde{x}=[\int\beta\ \beta]_T$. The dynamics visibly remain the same, whereas the physical meaning and the input change. Unlike $\beta$ and $\dot{\beta}$ should be stabilized at zero, but not the time integral $\int\beta$. Since the regulator should be able to maintain a desired speed $\dot{s}_{x,d}$ the desired stable state should be permanently calculated from $\dot{\tilde{x}}=0$ as $$\tilde{x}_d = \begin{bmatrix} \frac{\dot{s}_{x,d}}{g} & 0 \end{bmatrix}^T. \quad (131)$$

This can also be considered a static pre-filter F in the frequency range that ensures that $$\lim_{s \to 0} G_{u,x_1}(s) = 1F$$

is for the transfer function from the speed input to the first state $$G_{u,x_1}(s) = \frac{1}{ls^2 + g}. \quad (132)$$

The first component of the new status vector $\tilde{x}$ can be estimated with the aid of a Kalman-Bucy filter on the basis of (130) with the system output value $y=[0\ 1]\tilde{x}$. The result is similar when a regulator on the basis of (127) is designed and the motor regulator is controlled the integrated input signal $u=\int_0^t \dot{s}_x(\tau)d\tau$.

The acquired feedback can be determined as a linear quadratic regulator (LQR) that can represent a linear quadratic Gaussian regulator structure (LQG) together with the Kalman-Bucy filter. Both the feedback and the Kalman control factor can be adapted to the cable length l for example using control factor plans.

To control the lifting hook closely along trajectories, a structure provided with two degrees of freedom as shown in FIG. 16 can—in a similar manner as already explained—be used together with a trajectory planner that provides a reference trajectory of the lifting hook position that can be differentiated by $C^3$. The trolley position can be added to the dynamic system in accordance with (130), from which the system $$\Sigma : \dot{x} = \underbrace{\begin{bmatrix} 0 & 1 & 0 \\ -\frac{g}{l} & 0 & 0 \\ 0 & 0 & 0 \end{bmatrix}}_{\tilde{A}} x + \underbrace{\begin{bmatrix} 0 \\ \frac{1}{l} \\ 1 \end{bmatrix}}_{B} u \quad (133)$$

results, where $u = \dot{s}_x$ so that the flat output value is $$z = \lambda^T x, \lambda^T [\tilde{B} \ \tilde{A}\tilde{B} \ \tilde{A}^2\tilde{B}] = \begin{bmatrix} 0 & 0 & \frac{g}{l} \end{bmatrix} \quad (134)$$

$$= [0 \ -l \ 1] = s_x - l\beta, \quad (135)$$

which corresponds to the hook position of the linearized case constellation. The state and the input can be algebraically parameterized by the flat output and its derivatives, and indeed with $z = [z \ \dot{z} \ \ddot{z}]^T$ as $$x = \Psi_x(z) = \begin{bmatrix} -\frac{\dot{z}}{g} & -\frac{\ddot{z}}{g} & z + \frac{l\ddot{z}}{g} \end{bmatrix}^T, \quad (136)$$

$$u = \Psi_u(z, \overset{(3)}{z}) = \dot{z} + \frac{l\dddot{z}}{g} \quad (137)$$

which enables the algebraic calculation of the reference states and of the nominal input control signal from the planned trajectory for z. A change of the setting point here shows that the nominal error can be maintained close to zero so that the feedback signal $u_{fb}$ of the regulator K is significantly smaller than the nominal input control value $u_{ff}$. In practice, the input control value can be set to $u_{fb}=0$ when the signal of the wireless inertial measurement unit is lost.

As FIG. 16 shows, the regulator structure provided with two degrees of freedom can have a trajectory planner TP that a gentle trajectory $z \in C^3$ for the flat output with limited derivations, for the input value $\Psi_u$ and the parameterization of the state $\Psi_x$, and for the regulator K.

The invention claimed is:

1. A crane comprising:
  a hoist cable, which extends from a crane boom and carries a load-receiving means;
  drive devices for moving a plurality of crane elements and displacing the load-receiving means;
  a control apparatus for controlling the drive devices such that the load-receiving means travels along a travel path; and
  a pendulum damping device for damping pendulum movements of the load-receiving means and/or of the hoist cable;
  wherein the pendulum damping device has a pendulum sensor for detecting and/or estimating deflection of the hoist cable and/or of the load-receiving means with respect to a vertical, and a controller component having a closed control circuit for influencing the control of the drive devices depending on the detected and/or estimated deflection;
  wherein the pendulum sensor has an inertial measurement unit (IMU), which is mounted on the load-receiving means, and has:
    acceleration and rotation rate sensor means for providing acceleration and rotation rate signals;
    first determining means for determining and/or estimating a tilt of the load-receiving means from the acceleration and rotation rate signals of the IMU; and
    second determining means for determining the detected and/or estimated deflection of the hoist cable and/or of the load-receiving means with respect to the vertical from the determined and/or estimated tilt of the load-receiving means and an inertial acceleration of the load-receiving means;
  wherein the first determining means comprises:
    a complementary filter having a highpass filter configured to filter the rotation rate signal of the IMU; and
    a lowpass filter configured to filter the acceleration signal of the IMU or a signal derived therefrom;
  wherein the complementary filter is configured to link with one another:
    an estimate of the tilt of the load-receiving means that is based on the highpass filtered rotation rate signal; and
    an estimate of the tilt of the load-receiving means that is supported by acceleration and that is based on the lowpass filtered acceleration signal; and
  wherein the complementary filter is further configured to determine the determined and/or estimated tilt of the load-receiving means from the linked estimates of the tilt of the load-receiving means supported by the rotation rate and by the acceleration.

2. The crane according to claim 1, wherein at least one of:
  the estimate of the tilt of the load-receiving means supported by the rotation rate comprises an integration of the highpass filtered rotation rate signal; or
  the estimate of the tilt of the load-receiving means supported by the acceleration is based on the quotient of a measured horizontal acceleration and on a measured vertical acceleration from which the estimate of the tilt supported by the acceleration is acquired using the relationship $$\varepsilon_{\beta,a} = \arctan\left(\frac{\kappa a_x}{\kappa a_z}\right)..$$

wherein $\varepsilon_{\beta,a}$ is the estimate of the tilt of the load-receiving means supported by the acceleration, $\kappa a_x$ is the measured horizontal acceleration, and $\kappa a_z$ is the measured vertical acceleration.

3. The crane according to claim 1, wherein the IMU comprises a wireless communication module configured to wirelessly transmit measurement signals and/or signals derived therefrom to a receiver, with the communication module and the receiver being connectable to one another via a wireless LAN connection and with the receiver being arranged at a trolley from which the hoist cable extends.

4. The crane according to claim 1, wherein, at the load-receiving means, there is provided pulley for the hoist cable, to which pulley there is coupled a generator for generating electrical energy which can be fed into a storage device which supplies the IMU with electrical energy.

5. The crane according to claim 4, wherein the pendulum sensor further comprises an imaging sensor system configured to look substantially vertically straight down in a region of a suspension point of the hoist cable; and
  wherein an image evaluation device is configured to evaluate an image provided by the imaging sensor system with respect to a position of the load-receiving means in the provided image and further configured to determine the detected and/or estimated deflection of the load-receiving means and/or the hoist cable and/or the deflection speed with respect to the vertical.

6. The crane according to claim 1, wherein the controller component is configured to track and/or adapt at least one characteristic regulation value in dependence on changes in at least one parameter from a parameter group load mass, hoist cable length, trolley position, and radius.

7. A crane comprising:
a hoist cable, which extends from a crane boom and carries a load-receiving means;
drive devices for moving a plurality of crane elements and displacing the load-receiving means;
a control apparatus for controlling the drive devices such that the load-receiving means travels along a travel path; and
a pendulum damping device for damping pendulum movements of the load-receiving means and/or of the hoist cable;
wherein the pendulum damping device has a pendulum sensor for detecting and/or estimating deflection of the hoist cable and/or of the load-receiving means with respect to a vertical, and a controller component having a closed control circuit for influencing the control of the drive devices depending on the detected and/or estimated deflection;
wherein the pendulum sensor has an inertial measurement unit (IMU), which is mounted on the load-receiving means, and has:
acceleration and rotation rate sensor means for providing acceleration and rotation rate signals;
first determining means for determining and/or estimating a tilt of the load-receiving means from the acceleration and rotation rate signals of the IMU; and
second determining means for determining the detected and/or estimated deflection of the hoist cable and/or of the load-receiving means with respect to the vertical from the determined and/or estimated tilt of the load-receiving means and an inertial acceleration of the load-receiving means; and
wherein the second determination means comprises a filter device and/or an observer device that takes account of the determined and/or estimated tilt of the load-receiving means as an input value and determines the detected and/or estimated deflection of the hoist cable and/or the load-receiving means with respect to the vertical from an inertial acceleration at the load-receiving means.

8. The crane according to claim 7, wherein the filter device and/or the observer device comprises a Kalman filter.

9. A crane comprising:
a hoist cable, which extends from a crane boom and carries a load-receiving means;
drive devices for moving a plurality of crane elements and displacing the load-receiving means;
a control apparatus for controlling the drive devices such that the load-receiving means travels along a travel path; and
a pendulum damping device for damping pendulum movements of the load-receiving means and/or of the hoist cable;
wherein the pendulum damping device has a pendulum sensor for detecting and/or estimating deflection of the hoist cable and/or of the load-receiving means with respect to a vertical, and a controller component having a closed control circuit for influencing the control of the drive devices depending on the detected and/or estimated deflection;
wherein the pendulum sensor has an inertial measurement unit (IMU), which is mounted on the load-receiving means, and has:
acceleration and rotation rate sensor means for providing acceleration and rotation rate signals;
first determining means for determining and/or estimating a tilt of the load-receiving means from the acceleration and rotation rate signals of the IMU; and
second determining means for determining the detected and/or estimated deflection of the hoist cable and/or of the load-receiving means with respect to the vertical from the determined and/or estimated tilt of the load-receiving means and an inertial acceleration of the load-receiving means; and
wherein the second determination means comprises a calculation device configured to calculate the detected and/or estimated deflection of the hoist cable and/or the load-receiving means with respect to the vertical from the quotient of a horizontal inertial acceleration and of an acceleration due to gravity.

10. A crane comprising:
a hoist cable, which extends from a crane boom and carries a load-receiving means;
drive devices for moving a plurality of crane elements and displacing the load-receiving means;
a control apparatus for controlling the drive devices such that the load-receiving means travels along a travel path; and
a pendulum damping device for damping pendulum movements of the load-receiving means and/or of the hoist cable;
wherein the pendulum damping device has a pendulum sensor for detecting and/or estimating deflection of the hoist cable and/or of the load-receiving means with respect to a vertical, and a controller component having a closed control circuit for influencing the control of the drive devices depending on the detected and/or estimated deflection;
wherein the pendulum sensor has an inertial measurement unit (IMU), which is mounted on the load-receiving means, and has:
acceleration and rotation rate sensor means for providing acceleration and rotation rate signals;
first determining means for determining and/or estimating a tilt of the load-receiving means from the acceleration and rotation rate signals of the IMU; and
second determining means for determining the detected and/or estimated deflection of the hoist cable and/or of the load-receiving means with respect to the vertical from the determined and/or estimated tilt of the load-receiving means and an inertial acceleration of the load-receiving means;
wherein the pendulum damping device has a structural dynamics sensor system configured to detect deformations and/or dynamic movements in themselves of structural components of the crane; and
wherein the controller component of the pendulum damping device is configured to take account of both the signals of the pendulum sensor and structural dynamics signals of the structural dynamics sensor system fed back to the control circuit that indicate the deformations and/or the dynamic movements in themselves of the structural components on the influencing of the control of the drive devices.

11. The crane according to claim 10, wherein the controller component comprises a regulation structure having one of two degrees of freedom and/or a feedforward module, in addition to the closed control circuit, to feed forward the control signals for the drive devices.

12. The crane according to claim 11, wherein the feedforward module is configured as a differential flatness model.

13. The crane according to claim 11 further comprising at least one of:
  a notch filter device configured to filter input signals supplied to the feedforward, wherein the notch filter device is further configured to eliminate stimulatable eigenfrequencies of the structural dynamics from the input signals;
  a trajectory planning module; or
  a desired value filter module configured to determine a desired progression for the load-receiving means position and its time derivatives from predetermined desired values for the load-receiving means are associated with the feedforward module.

14. The crane according to claim 13, wherein the notch filter device is provided between the trajectory planning module or the desired value filter module and the feedforward module.

15. The crane according to claim 11, wherein the feedforward module is configured to carry out the feed forward without taking account of the signals of the pendulum sensor and of the structural dynamics signals of the structural dynamics sensor system.

16. The crane according to claim 10, wherein the controller component has a regulation model that divides the structural dynamics of the crane into mutually independent portions including a pivot dynamics portion that takes account of the structural dynamics with respect to the pivoting of a crane boom about an upright axis of rotation of the crane, and a radial dynamics portion that takes account of structural dynamics movements in parallel with a vertical plane in parallel with the crane boom.

17. The crane according to claim 10, wherein the structural dynamics sensor system comprises:
  a radial dynamics sensor configured to detect dynamic movements of the crane structure in an upright plane in parallel with a crane boom; and
  a pivot dynamics sensor configured to detect dynamic movements of the crane structure about an upright axis of rotation of the crane; and
  wherein the controller component of the pendulum damping device is further configured to influence the control of the drive devices in dependence on the detected dynamic movements of the crane structure in the upright plane in parallel with the boom and on the detected dynamic movements of the crane structure about the upright axis of rotation of the crane.

18. The crane according to claim 10, wherein the structural dynamics sensor system at least one of:
  comprises a hoist dynamics sensor configured to detect vertical dynamic deformations of a crane boom, wherein the controller component of the pendulum damping device is further configured to influence the control of the drive devices in dependence on the detected vertical deformations of the crane boom;
  is further configured to determine dynamic torsions of a crane tower carrying the crane boom and/or of the crane boom, wherein the controller component of the pendulum damping device is further configured to influence the control of the drive devices in dependence on the determined dynamic torsions of the crane boom and/or the crane tower; or
  is further configured to detect all eigenmodes of the determined dynamic torsions of the crane boom and/or the crane tower whose eigenfrequencies lie in a predefined frequency range, wherein the structural dynamics sensor system comprises:
    a plurality of tower sensors that are arranged spaced apart from a node of an eigen-oscillation of a tower configured to detect tower torsions; and
    a plurality of boom sensors that are arranged spaced apart from a node of an eigen-pendulum of a boom configured to detect boom torsions.

19. The crane according to claim 10, wherein the structural dynamics sensor system comprises strain gauges, accelerometers, and rotation rate sensors, configured to detect the deformations and/or dynamic movements of structural components of the crane in themselves, with the accelerometers and/or rotation rate sensors being further configured as detecting three axes.

20. The crane according to claim 10, wherein the structural dynamics sensor system comprises:
  a sensor configured to detect dynamic tower deformations; and
  a sensor configured to detect dynamic boom deformations; and
  wherein each sensor is selected from the group consisting of a rotation rate sensor, an accelerometer, a strain gauge, and any combination thereof.

21. A crane comprising:
  a hoist cable, which extends from a crane boom and carries a load-receiving means;
  drive devices for moving a plurality of crane elements and displacing the load-receiving means;
  a control apparatus for controlling the drive devices such that the load-receiving means travels along a travel path; and
  a pendulum damping device for damping pendulum movements of the load-receiving means and/or of the hoist cable;
  wherein the pendulum damping device has a pendulum sensor for detecting and/or estimating deflection of the hoist cable and/or of the load-receiving means with respect to a vertical, and a controller component having a closed control circuit for influencing the control of the drive devices depending on the detected and/or estimated deflection;
  wherein the pendulum sensor has an inertial measurement unit (IMU), which is mounted on the load-receiving means, and has:
    acceleration and rotation rate sensor means for providing acceleration and rotation rate signals;
    first determining means for determining and/or estimating a tilt of the load-receiving means from the acceleration and rotation rate signals of the IMU; and
    second determining means for determining the detected and/or estimated deflection of the hoist cable and/or of the load-receiving means with respect to the vertical from the determined and/or estimated tilt of the load-receiving means and an inertial acceleration of the load-receiving means; and
  wherein the controller component comprises a filter device and/or observer device configured to influence control variables of drive regulators configured to control the drive devices, with the filter device and/or the observer device being further configured to obtain the control variables of the drive regulators and both the signals of the pendulum sensor and/or structural dynamics signals that are fed back to the control circuit that give deformations and/or dynamic movements of structural components of the crane in themselves as input values, and to influence the control variables of the drive regulators based on the dynamic movements of the structural components and/or deformations of the structural components obtained for specific control variables of the drive regulators.

22. The crane according to claim 21, wherein the filter device and/or the observer device is further configured as a Kalman filter.

23. The crane according to claim 22, wherein at least one function that characterizes the deformations and/or the dynamic movements of the structural elements of the crane are implemented in the Kalman filter.

24. A method for controlling a crane whose load-receiving means attached to a hoist cable is moved by drive devices, which drive devices are controlled by a control apparatus of the crane;
  wherein the control of the drive devices is influenced by a pendulum damping device comprising a controller module with a closed control circuit in dependence on pendulum-relevant parameters, characterized in that acceleration and rotation rate signals, which indicate the rotation rates and translatory accelerations at a lifting hook, are provided at the lifting hook by an inertial measurement unit (IMU) mounted there with acceleration and rotation rate sensors and are transmitted wirelessly to the controller module;
  wherein a tilt of the load-receiving means is determined from the acceleration and rotation rate signals of the IMU, and then a deflection of the hoist cable and/or of the load-receiving means with respect to a vertical is determined from the determined tilt of the load-receiving means and an inertial acceleration of the load-receiving means and fed back to the closed control circuit; and
  wherein at least one of:
    (i) the acceleration signals, which indicate the translatory accelerations at the lifting hook are determined with respect to three at least two spatial axes and the rotation rate signals, which indicate the rotation rates at the lifting hook are detected with respect to the at least two spatial axes, wherein the acceleration and rotation rate signals are fed back to a complementary filter having a highpass filter configured to filter the rotation rate signal of the IMU and a lowpass filter configured to filter the acceleration signal of the inertial measurement unit or a signal derived therefrom, wherein, the complementary filter is configured to link an estimate of the tilt of the load-receiving means that is supported by rotation rate and that is based on the highpass filtered rotation rate signal and an estimate of the tilt of the load-receiving means that is supported by acceleration and that is based on the lowpass filtered acceleration signal, and to determine the determined and/or estimated tilt of the load-receiving means from the linked estimates of the tilt of the load-receiving means supported by rotation rate and by the acceleration; or
    (ii) the deflection of the hoist cable and/or of the load-receiving means with respect to the vertical is determined from an inertial acceleration at the load-receiving means by a filter device and/or an observer device to which the determined and/or estimated tilt of the load-receiving means is fed back as an input variable.

* * * * *